May 18, 1937.　　E. D. RADER ET AL　　2,080,505
FOLDING MACHINE
Filed Feb. 19, 1931　　15 Sheets-Sheet 4
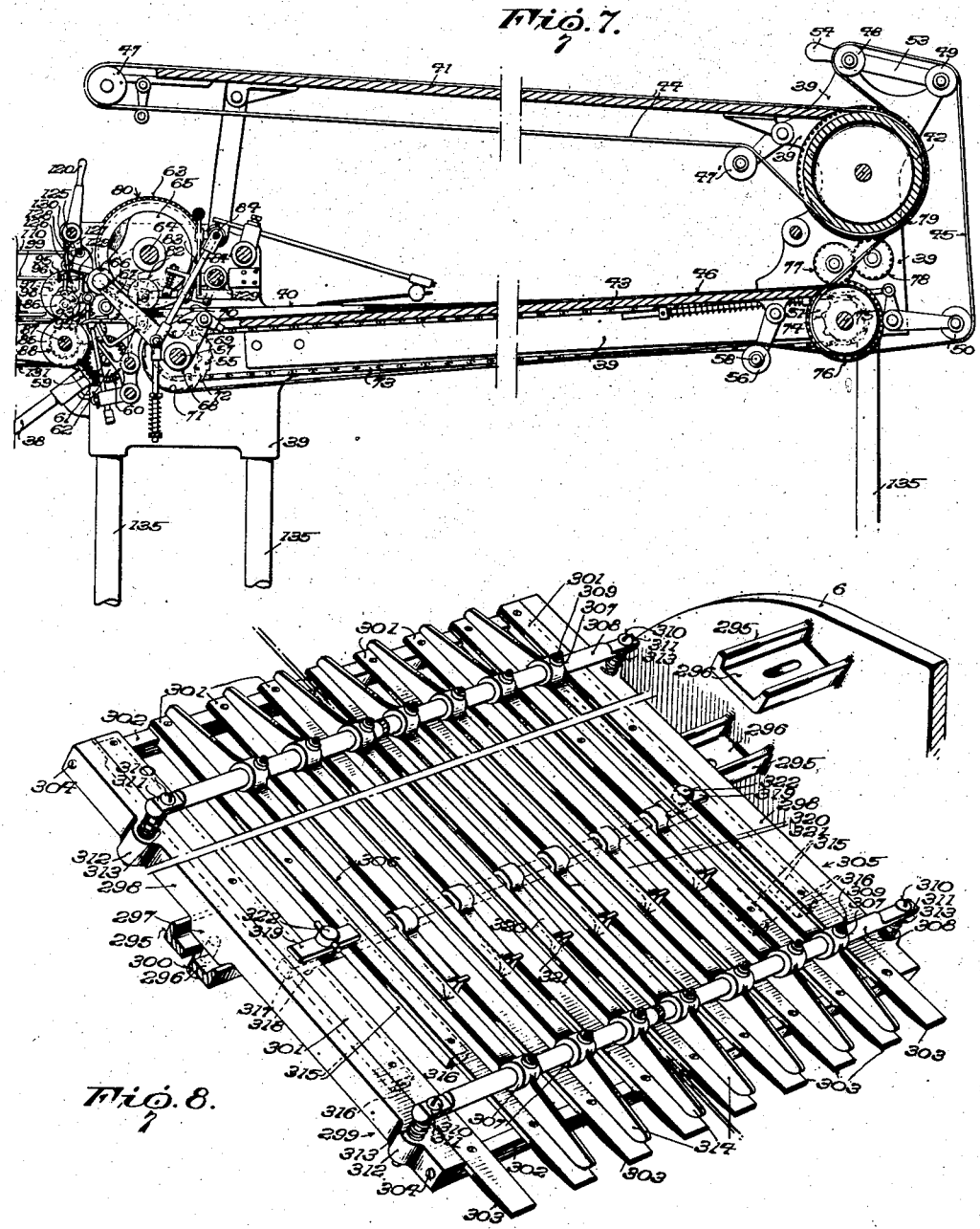

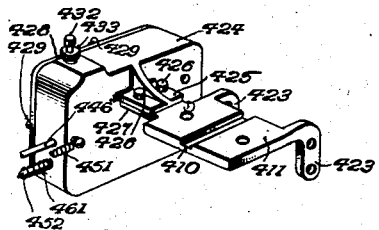
Fig. 2.
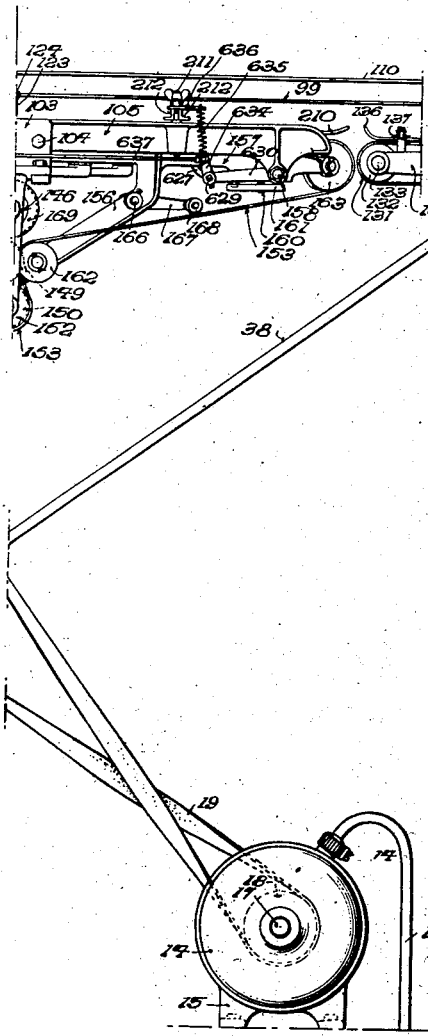
Fig. 1ᵃ
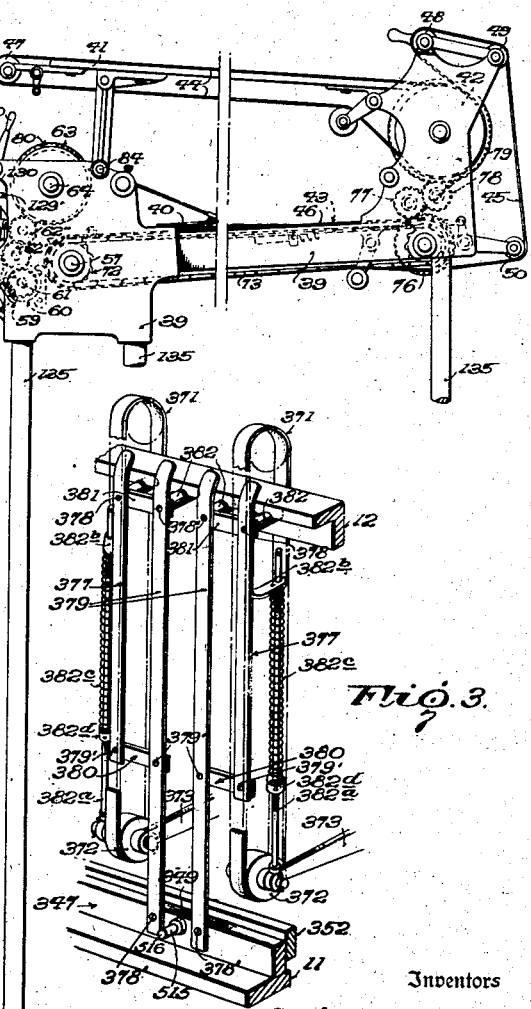
Fig. 3.
Inventors
Earl D. Rader.
Edwin W. Goodwin.
By Cameron, Kerkam & Sutton.
Attorneys

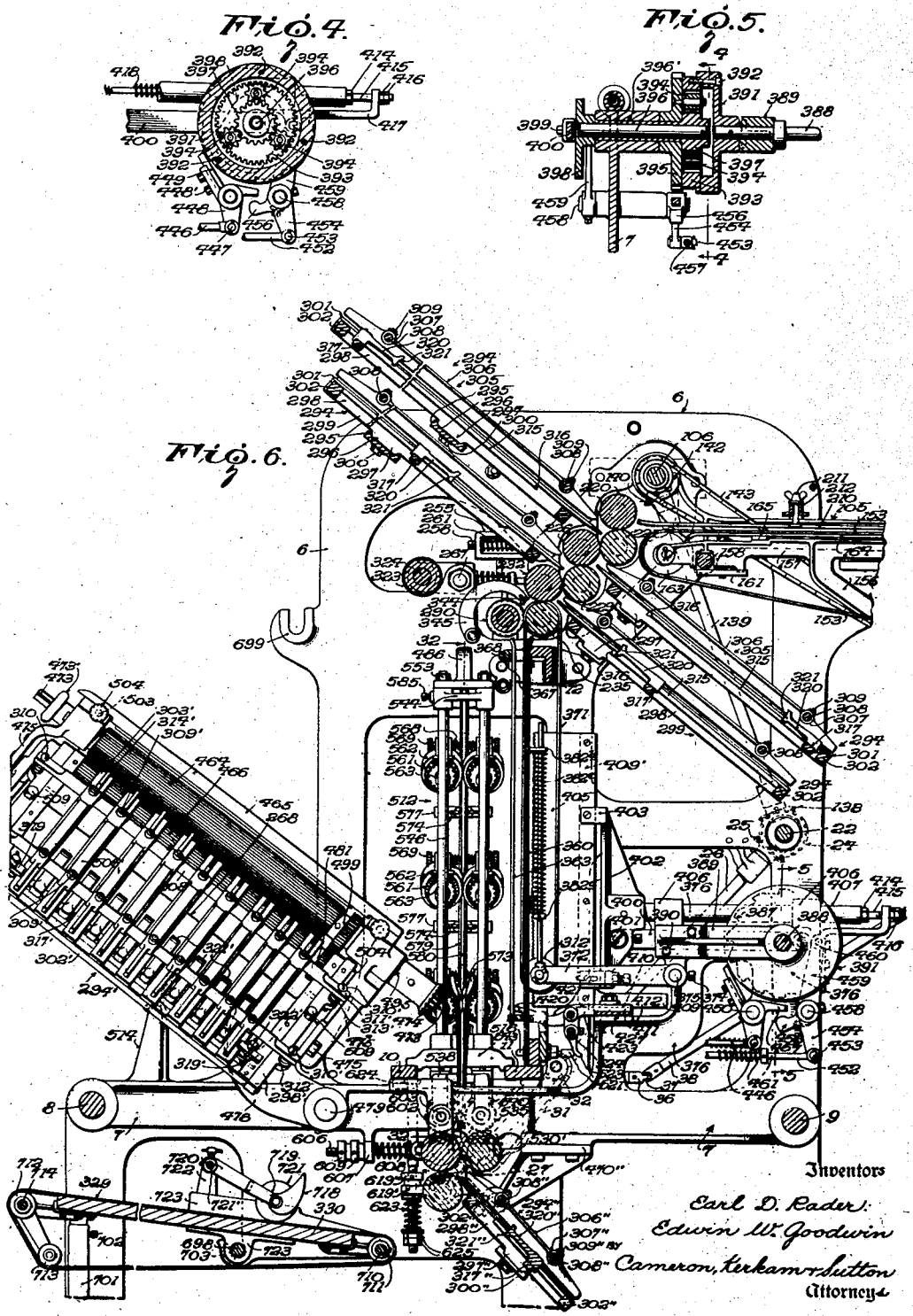

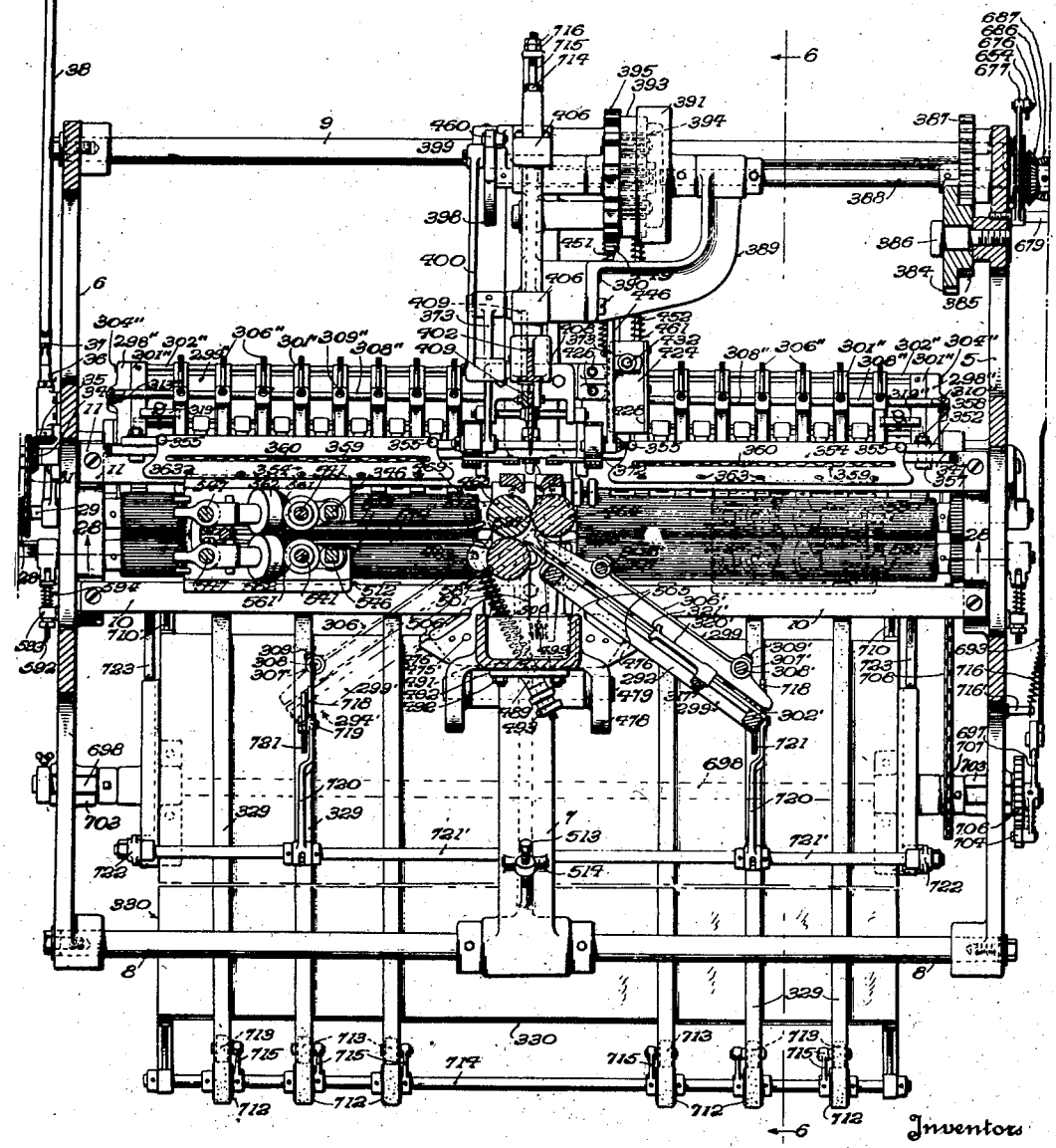

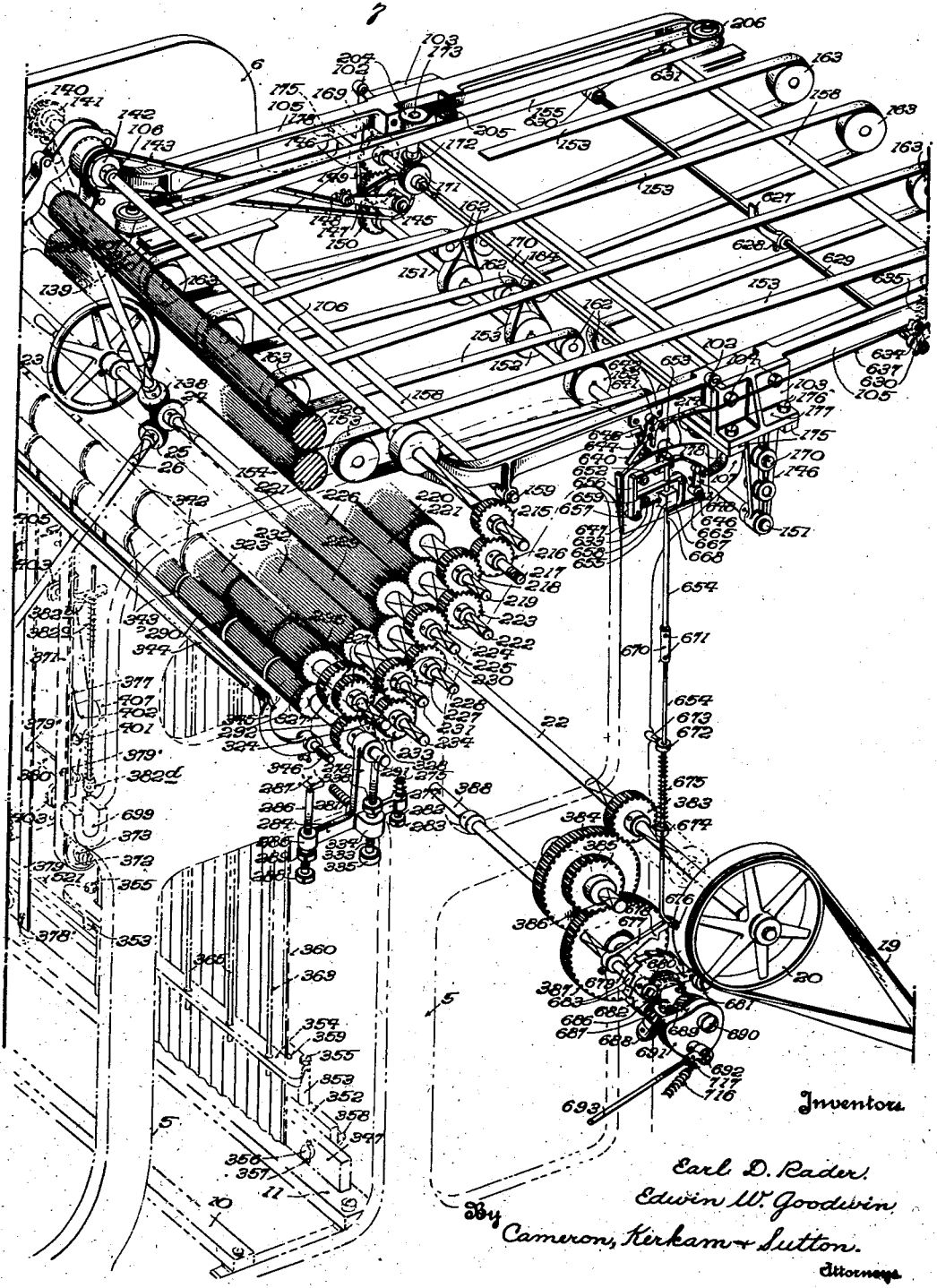

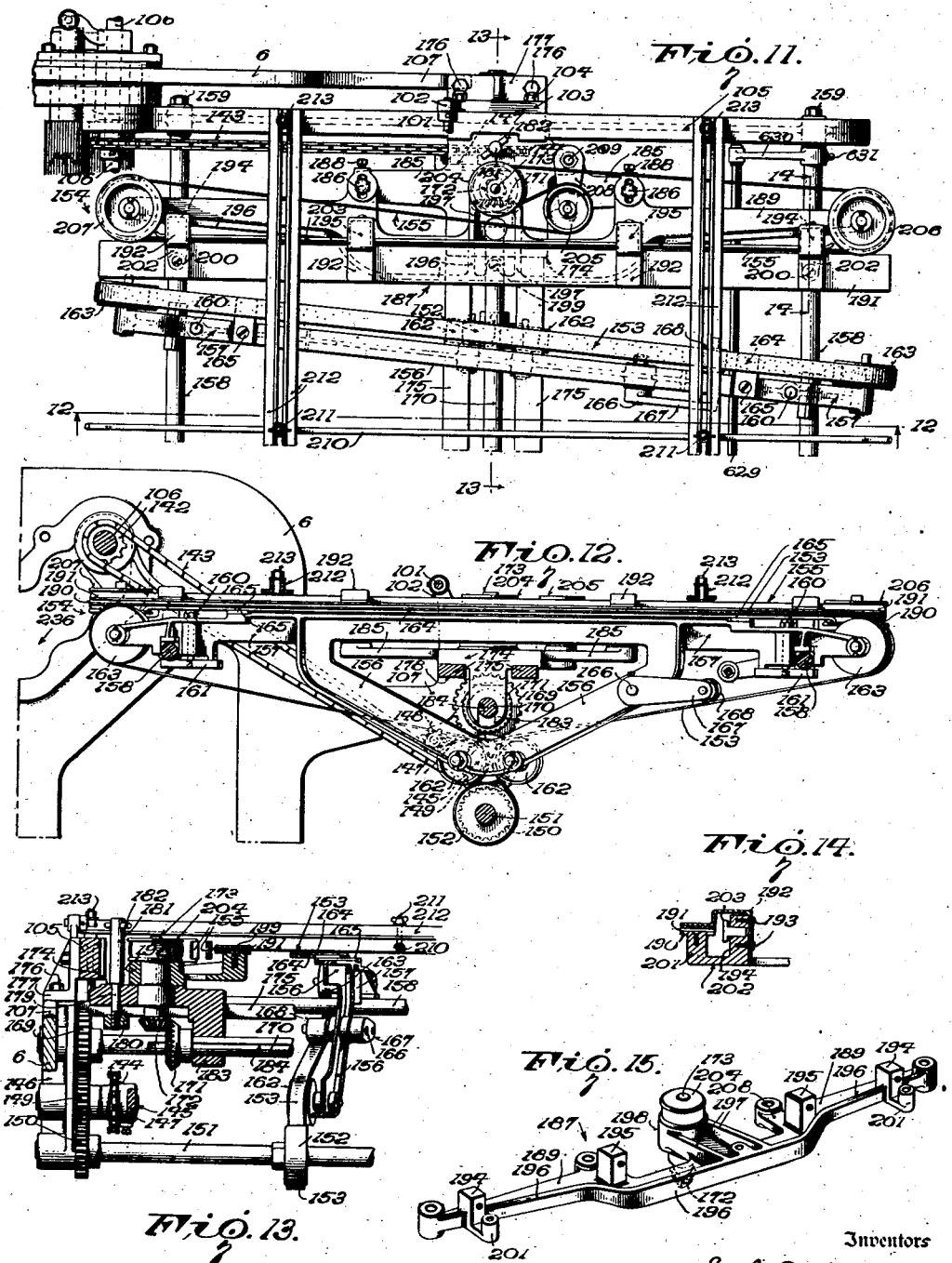

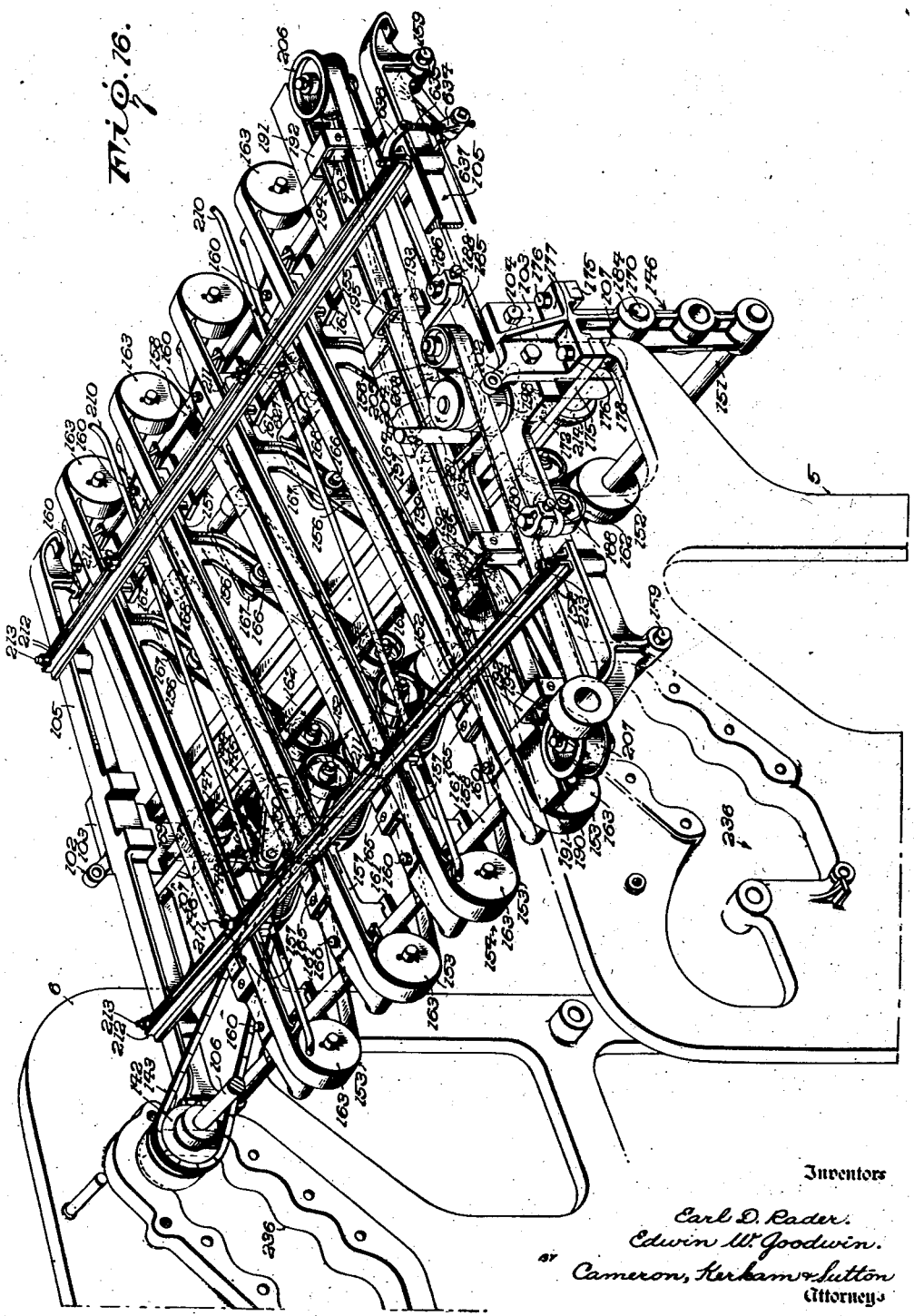

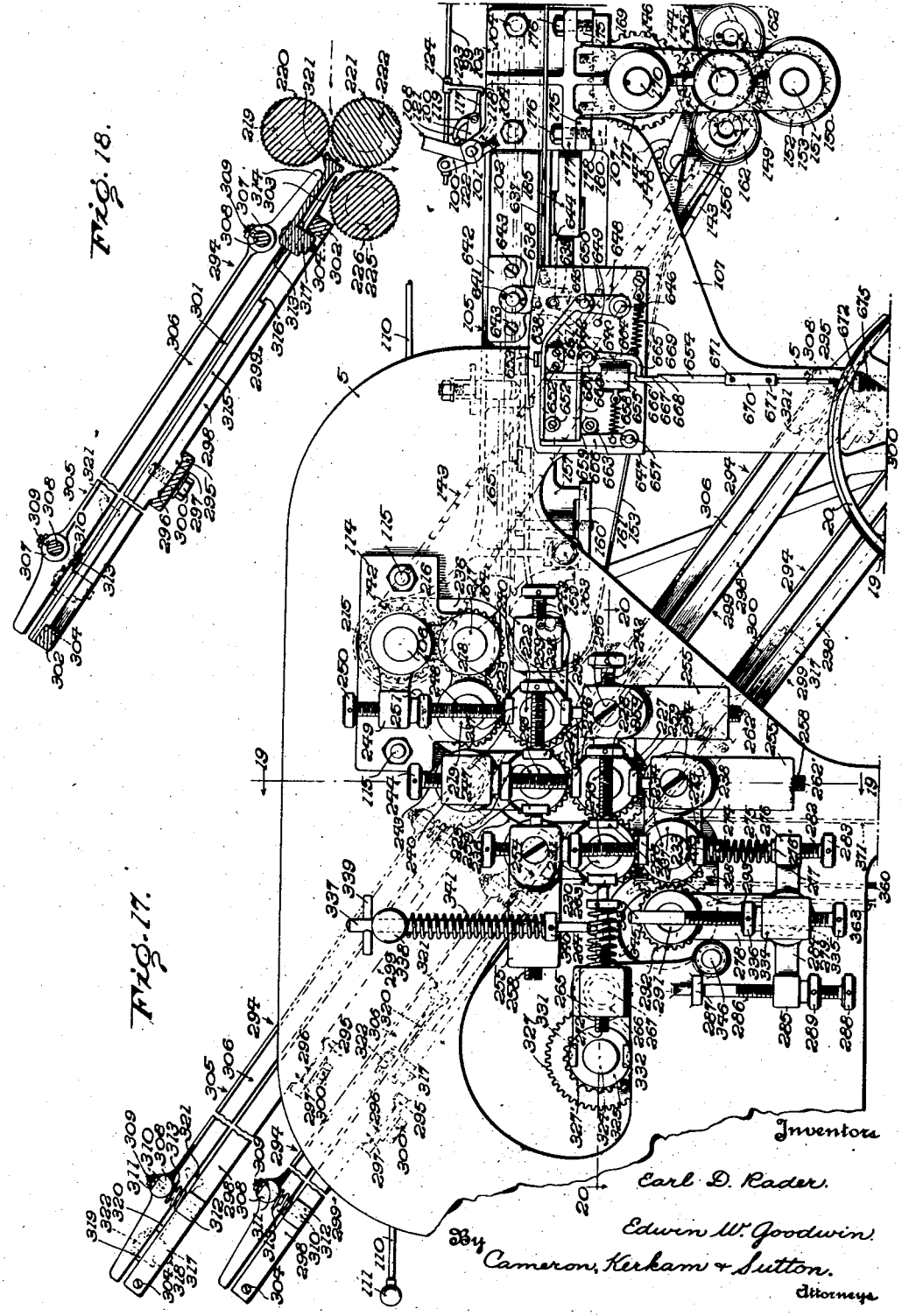

May 18, 1937.  E. D. RADER ET AL  2,080,505
FOLDING MACHINE
Filed Feb. 19, 1931   15 Sheets—Sheet 10

Inventors
Earl D. Rader.
Edwin W. Goodwin.
By Cameron, Kerkam & Sutton.
Attorneys

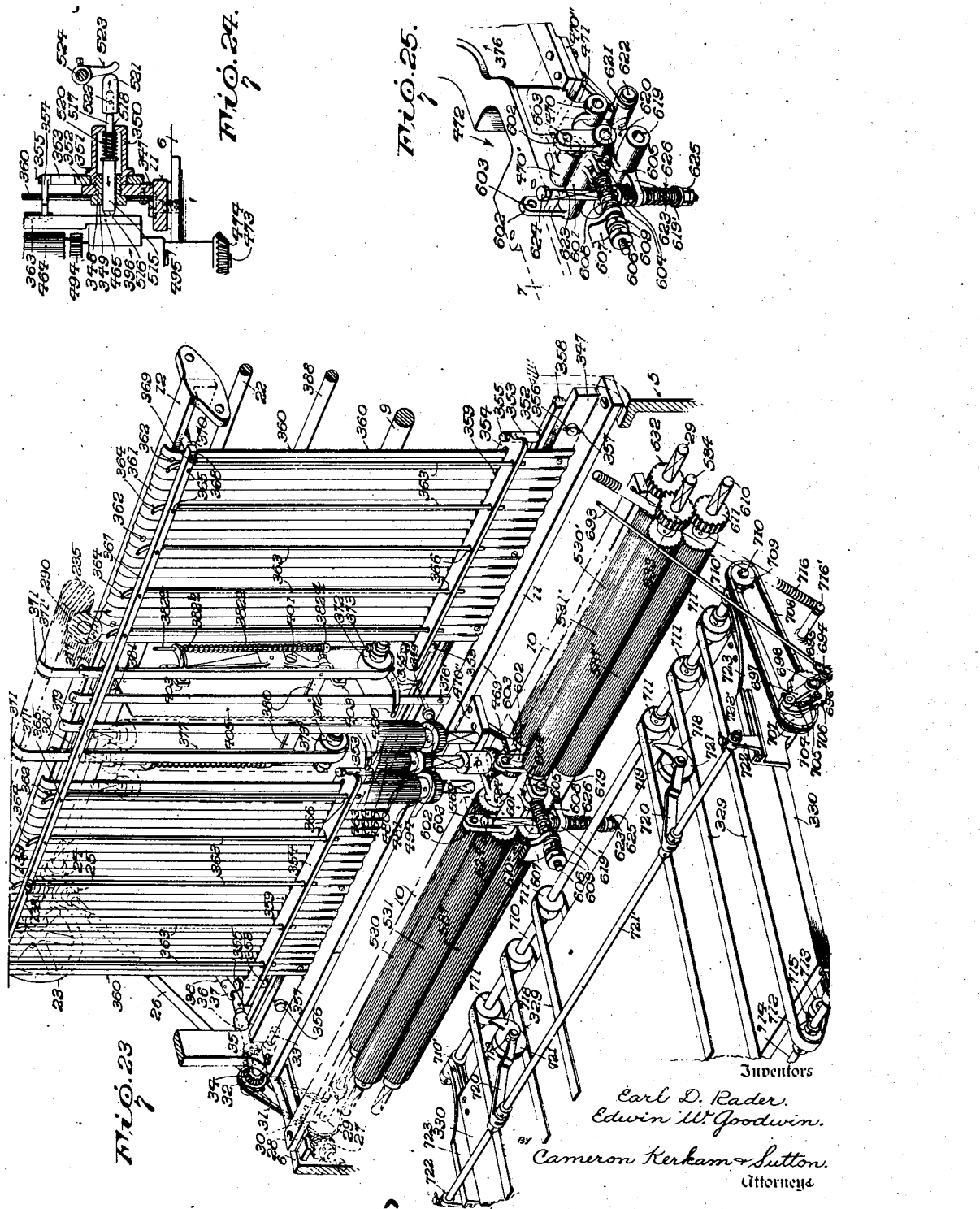

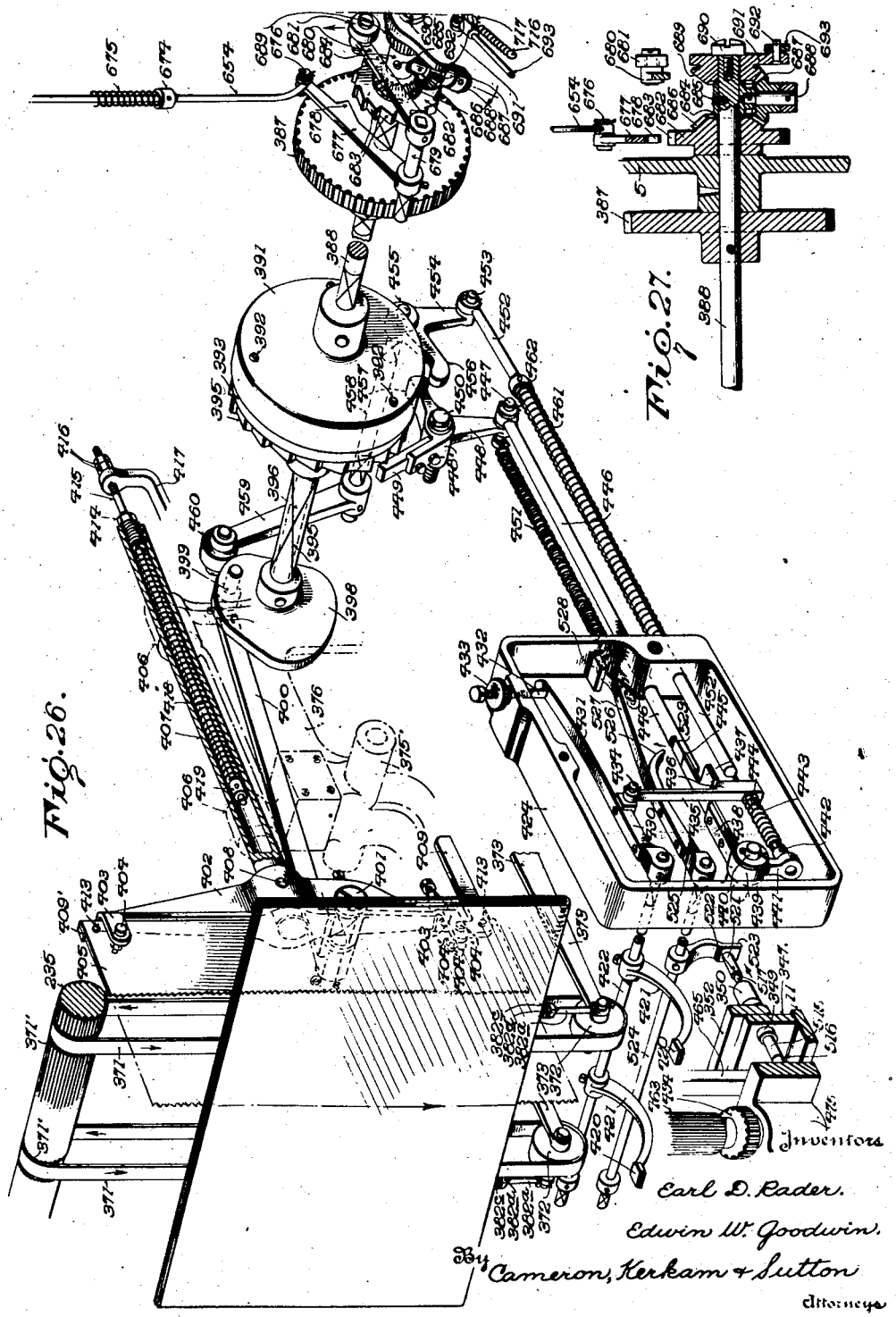

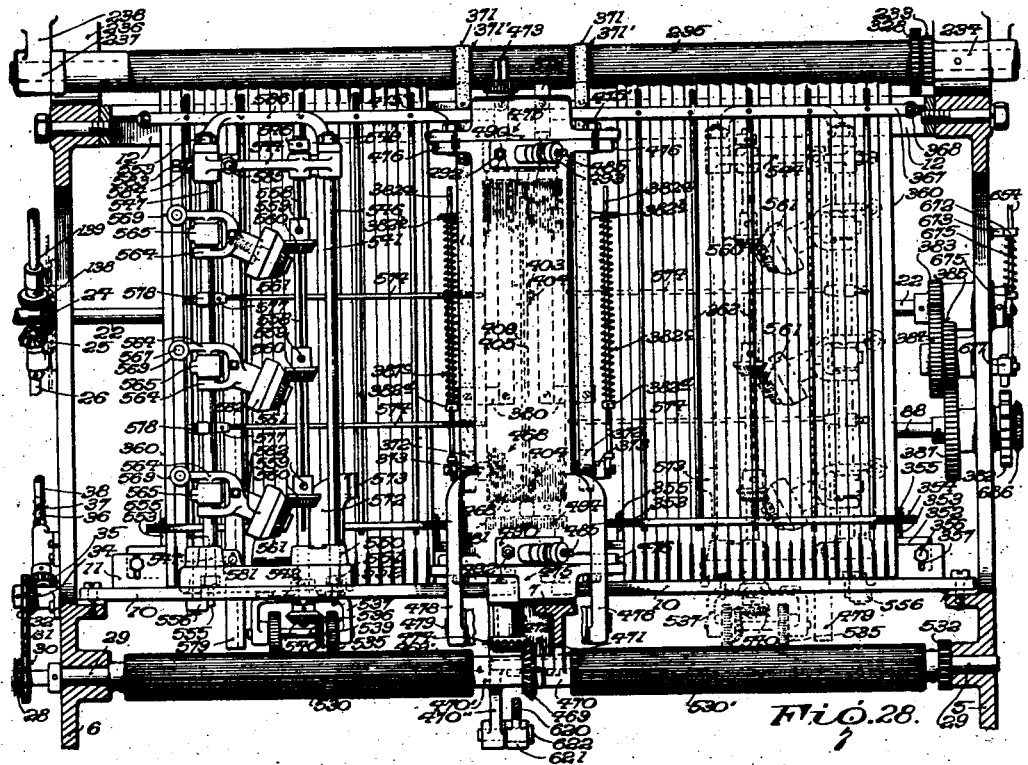
Fig. 28.
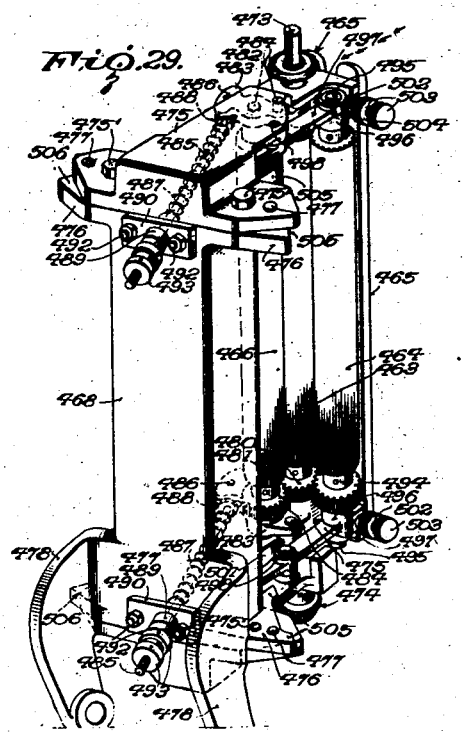
Fig. 29.
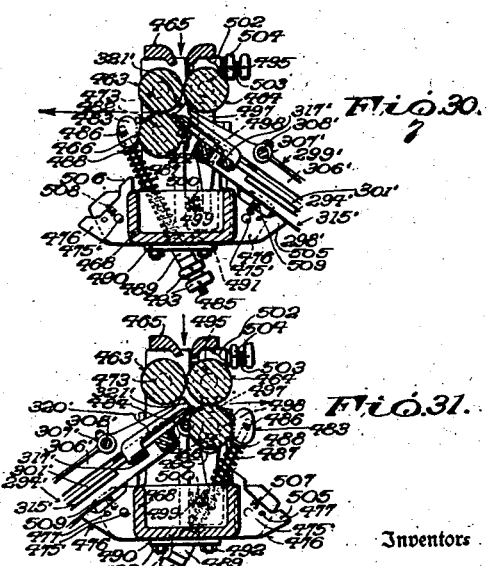
Fig. 30.
Fig. 31.
Inventors
Earl D. Rader.
Edwin W. Goodwin.
By Cameron, Kerkam & Sutton
Attorneys

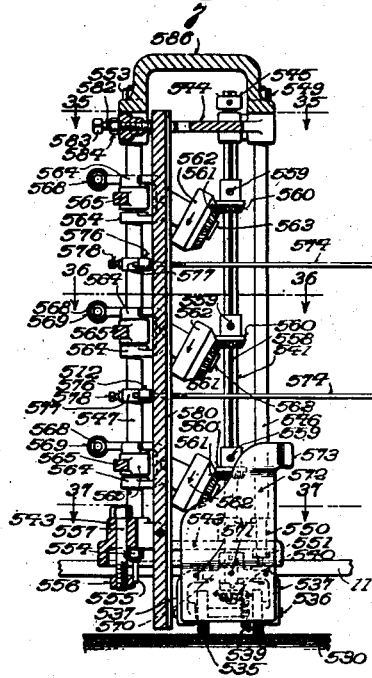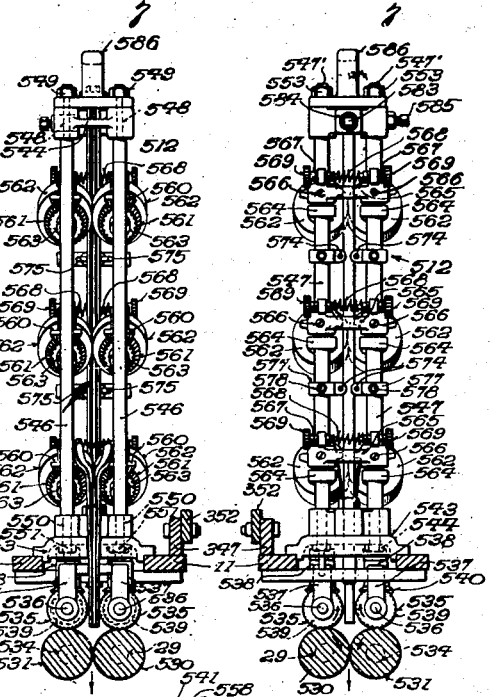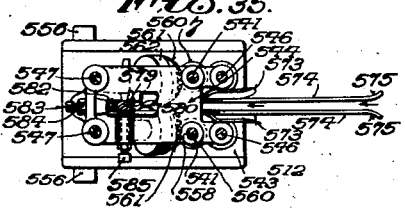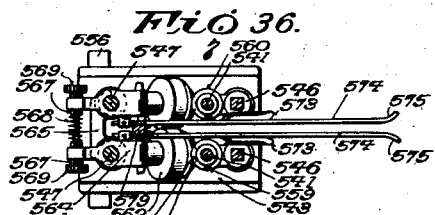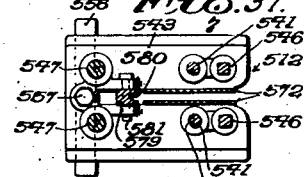

May 18, 1937.  E. D. RADER ET AL  2,080,505
FOLDING MACHINE
Filed Feb. 19, 1931   15 Sheets-Sheet 15
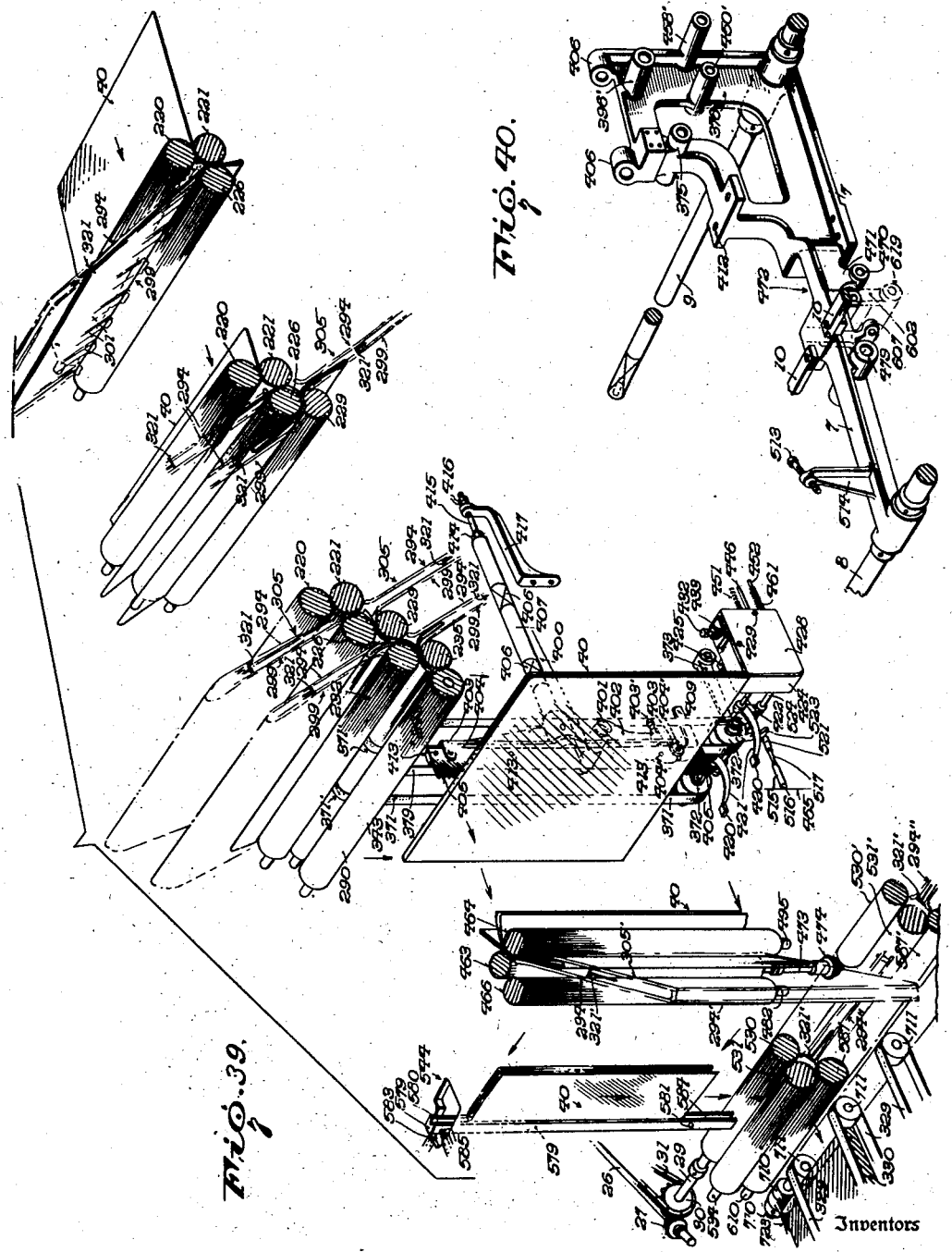
Inventors
Carl D. Rader.
Edwin W. Goodwin.
By Cameron, Kerkam & Sutton.
Attorneys Patented May 18, 1937

2,080,505

UNITED STATES PATENT OFFICE 2,080,505

FOLDING MACHINE

Earl D. Rader, Mount Kisco, and Edwin W. Goodwin, New Rochelle, N. Y., assignors to Dexter Folder Company, New York, N. Y., a corporation of New York Application February 19, 1931, Serial No. 517,049

95 Claims. (Cl. 270—62)

This invention relates to folding machines, and while capable of general use, is more particularly adapted for embodiment in machines that loop fold sheets of paper, or knife fold sheets of paper, or both.

One object of the present invention is to provide an improved folding machine which is capable of making a wide variety of folds in sheets and enables the various folded products required by the trade to be made in a single machine.

Another object of this invention is to provide an improved loop folding machine which has loop folding mechanisms and auxiliary devices therefor associated in a compact and novel manner and adjustable to various positions, as desired.

Another object of this invention is to provide an improved folding machine which embodies a knife folder and one or more loop folders preceding and following the knife folder, respectively, and cooperating therewith in a novel manner to produce various forms of folded products.

Another object of this invention is to provide a loop folder which has sheet stopping and deflecting means combined in a single device mounted on the grid and adjustable therealong to various positions.

Another object of this invention is to provide a loop folding machine that has novel and improved arrangements of grids and rollers and in which each grid carries a combined sheet stop and deflector adjustable thereon to various positions.

Another object of this invention is to provide a loop folding mechanism which enables a maximum number of folds to be made in a sheet with a minimum number of feeding and folding rollers.

Another object of this invention is to provide a loop folder which has a plurality of grids and feeding and folding rollers associated with said grids as a single roller assembly so that the space required for said grids and said rollers is reduced to a minimum.

Another object of this invention is to provide a loop folder which has improved bearings for the feeding and folding rollers enabling the latter to be readily moved into and out of position independently of each other through either side of the machine.

Another object of this invention is to provide a loop folder having improved roller bearings that pivotally mount the feeding and folding rollers to facilitate adjustments thereof and which are nested and interfitted to reduce the space required for the rollers and assist in the making of said adjustments.

Another object of this invention is to provide a loop folder that has improved roller adjusting devices and in which certain of the latter are mounted on the roller bearings in such manner that the adjusting devices on the bearings of one roller engage the bearings of an adjacent roller and act therethrough to adjust the latter.

Another object of this invention is to provide a loop folder which has rollers and a deflector each shiftable so that sheets may be slit by devices on one roller and delivered directly out of the machine, or passed, without slitting, to other parts of the machine for folding thereby.

Another object of this invention is to provide a loop folder which has associated therewith slitting means that may be thrown into and out of operation at will without removal of the slitter blades and supporting means therefor.

Another object of this invention is to provide a loop folder which has slitting means movable into and out of operative position and independent yieldable retaining means engageable with and disengageable from the same.

Another object of this invention is to provide an improved transfer mechanism which carries or guides sheets from a loop folding mechanism to a knife folding mechanism.

Another object of this invention is to provide an improved, mechanically operated, sheet controlled knife folder that cooperates with a preceding folding mechanism from which the sheets may be delivered, either folded, or unfolded, to said knife folder for folding thereby.

Another object of this invention is to provide a loop folder which has parts shiftable to fold sheets in different impositions and movable as a unit with remaining parts of the folder so that the latter may be thrown into and out of operative relation with another folder.

Another object of this invention is to provide a loop folder which is movable as a unit into and out of operative relation with a knife folder and has a drive that is automatically connected and disconnected as the loop folder is moved into and out of operative relation with said knife folder, respectively.

Another object of this invention is to provide a folding machine which has a folding device controlled through movement of another folding device into and out of operative relation therewith.

Another object of this invention is to provide a transfer mechanism which is selectively movable into operative relation with a loop folder at either side thereof in accordance with the type of folds to be made in the sheets thereby and the direction of delivery of the sheets therefrom.

Another object of this invention is to provide a transfer mechanism which is selectively movable into operative relation with a loop folder at either side thereof and adapted to transfer sheets therefrom to one side or the other of a succeeding loop folder.

Another object of this invention is to provide two folders extending transversely of each other and constructed so that both may fold sheets in different types of imposition and one may receive sheets delivered from either side of the other.

Another object of this invention is to provide a loop folder which extends transversely of a preceding folder across the entire width of the machine and is supported centrally thereof by means carrying said preceding folder.

Another object of this invention is to provide knife and loop folder supporting means which serve to accurately guide the knife folder with respect to the loop folder.

Another object of this invention is to provide an improved folding machine which may fold a sheet with one or more parallel loop folds, one knife fold at right angles to the parallel loop fold or folds, a second right angle loop fold in either book or news imposition, and a following parallel loop fold in either book or news imposition.

Another object of this invention is to provide a stacker which is selectively movable into operative relation with different loop folding mechanisms to receive the sheets from any one of the same.

Another object of this invention is to provide a stacker which is selectively movable into operative relation with different loop folding instrumentalities and may be driven in all of its operative positions by a single driving means.

Another object of this invention is to provide a stacker which is selectively movable into operative relation with different loop folding mechanisms and has a width such that it may receive the sheets from each of said loop folding mechanisms from either side thereof.

Another object of this invention is to provide a folding machine with a stacker which is controlled by the sheets fed into said machine.

Another object of this invention is to provide a folding machine which has a sheet feeding conveyor therefor arranged so that it may be swung up and down to inoperative and operative positions thereon, as desired.

Another object of this invention is to provide a sheet feeding conveyor which has a movable endless side guide or registering device carried thereby and selectively movable from one side of said conveyor to the opposite side thereof, as desired.

Another object of this invention is to provide a sheet feeding conveyor which has a driven endless side guide mounted thereon and movable therewith to operative and inoperative positions.

Another object of this invention is to provide a sheet feeding conveyor and a movable endless sheet guide which have driving connections arranged so that the conveyor and the endless guide may be moved as a unit to operative and inoperative positions without disturbing said connections.

Another object of this invention is to provide a sheet feeding conveyor which has sheet supporting and feeding devices independently adjustable on the conveyor so as to enable the sheets to be directed toward, and registered at, either side thereof.

Another object of this invention is to provide a sheet feeding conveyor which has separate tape carrying frames adjustable thereon so that the tapes may be independently moved angularly toward one side or the other of the conveyor, as desired.

Another object of this invention is to provide a driven endless side guide which may be selectively positioned at one side or the other of a conveyor and has driving connections that are automatically connected and disconnected upon movement of said side guide into and out of position, respectively.

These and other objects of the present invention will appear as the following description thereof proceeds, and in order to more clearly understand said invention reference may be had to the accompanying drawings:

In said drawings:

Figs. 1 and 1a are complementary side elevations of a folding machine embodying the present invention;

Fig. 2 is a detail perspective view of a control mechanism housing and its supporting means;

Fig. 3 is a detail perspective view of parts of a first transfer mechanism;

Fig. 4 is a vertical longitudinal sectional view on the line 4—4 of Fig. 5, showing parts of a planetary gear knife operating mechanism;

Fig. 5 is a vertical transverse sectional view on the line 5—5 of Fig. 6;

Fig. 6 is a vertical longitudinal sectional view on the line 6—6 of Fig. 9;

Fig. 7 is an enlarged vertical longitudinal sectional view of a sheet feeder shown in Fig. 1a;

Fig. 8 is an enlarged detail perspective view of a grid, a combined sheet stop and deflector, and adjusting and securing means for the latter;

Fig. 9 is a horizontal longitudinal sectional view on the line 9—9 of Fig. 1, the stacker being shown in a different position from that illustrated in Fig. 1;

Fig. 10 is a detail perspective view of a conveyor, sheet feeding and folding rollers, and driving mechanism for these and other parts of the machine;

Fig. 11 is a fragmentary top plan view of the conveyor and an endless side guide or sheet register thereon, the latter being shown at the far side of the conveyor;

Fig. 12 is a vertical longitudinal sectional view on the line 12—12 of Fig. 11;

Fig. 13 is a transverse vertical sectional view on the line 13—13 of Fig. 11;

Fig. 14 is a transverse vertical sectional view on the line 14—14 of Fig. 11;

Fig. 15 is a detail perspective view of a bracket or support for the endless side guide or register;

Fig. 16 is a detail perspective view of the sheet conveyor and the endless side guide or register, the latter being shown on the near side of the conveyor;

Fig. 17 is an enlarged fragmentary side elevation of the machine, including grids, rollers, bearings, and combined sheet stops and deflectors, shown in Fig. 1;

Fig. 18 is a vertical longitudinal sectional view of one of said grids, its associated sheet feeding and folding rollers, and combined sheet stop and deflector;

Fig. 23 is an enlarged detail perspective view of parts of the first transfer mechanism, the second, third, and fourth folding mechanisms, the stacker, and driving means for the aforesaid instrumentalities;

Fig. 24 is an enlarged vertical longitudinal sectional view of means pivotally mounting the first transfer mechanism and carrying parts of devices controlled by the third folding mechanism and in turn controlling the knife or second folding mechanism;

Fig. 25 is a detail perspective view of center bearings for rollers of the fourth folding mechanism;

Fig. 26 is an enlarged detail perspective view of the knife or second folding mechanism, showing portions of knife operating means and sheet actuated controlling devices therefor;

Fig. 27 is an enlarged transverse vertical sectional view of part of the stacker operating mechanism;

Fig. 28 is a transverse vertical sectional view on the line 28—28 of Fig. 9;

Fig. 29 is a detail perspective view of the third folding mechanism;

Figs. 30 and 31 are fragmentary transverse horizontal sectional views of the third folding mechanism with parts shifted to opposite sides thereof, respectively;

Fig. 32 is a transverse sectional view on the line 32—32 of Fig. 6, showing a shiftable, second transfer mechanism;

Figs. 33 and 34 are side elevations of the mechanism shown in Fig. 32, looking from the right and left thereof, respectively;

Figure 1:
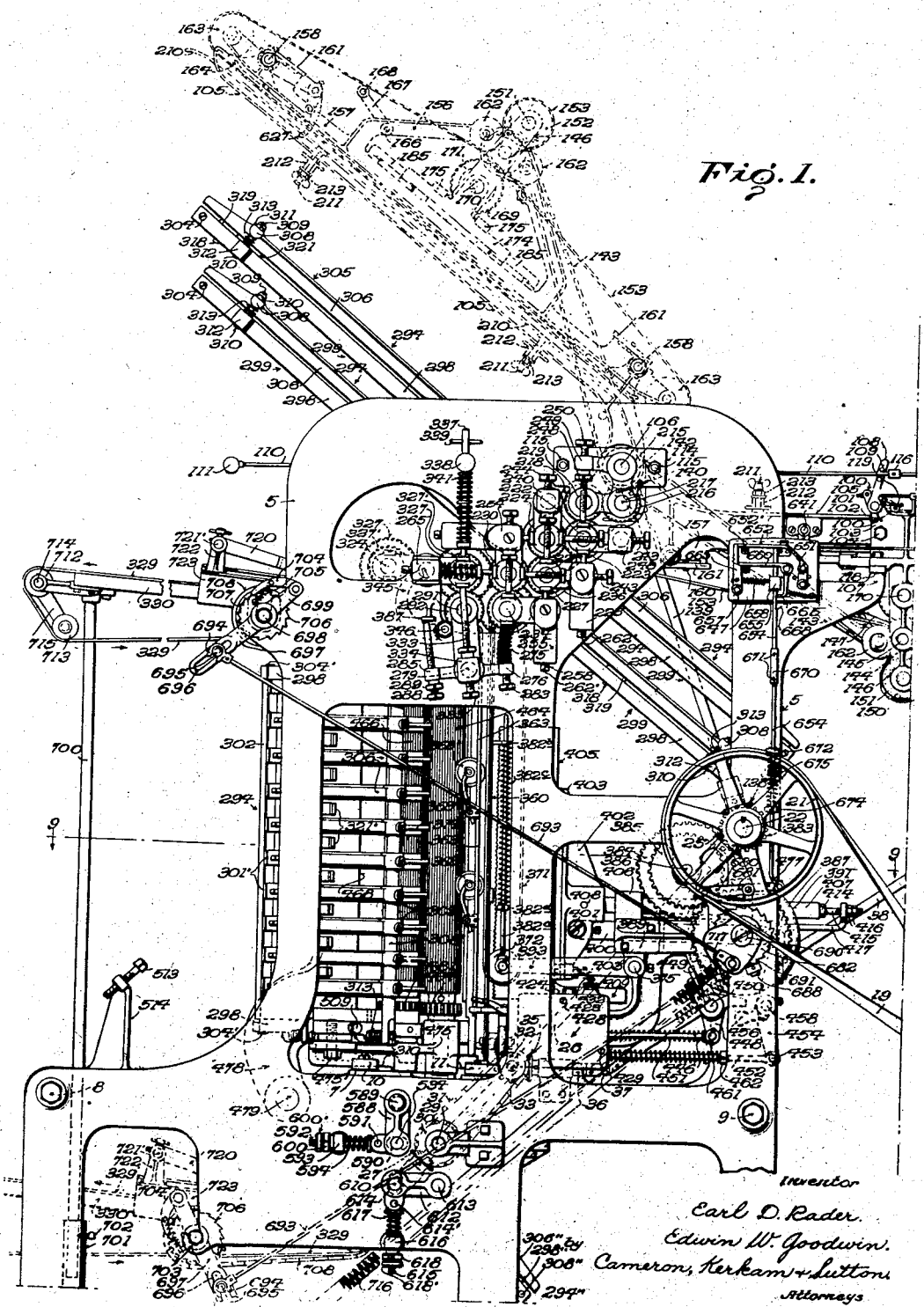

Figs. 35, 36, and 37 are transverse horizontal sectional views on the lines 35—35, 36—36, and 37—37 of Fig. 32, respectively;

Fig. 38 is a detail perspective view of portions of the second transfer mechanism shown in Figs. 32 to 37, inclusive;

Fig. 39 is a diagrammatic perspective view of the various folding mechanisms, showing the path of travel of sheets therethrough, and Fig. 40 is a reduced detail perspective view of the center frame member of the machine.

In the embodiment of the invention herein disclosed, there is employed a main frame and driving mechanism, a sheet feeder, a sheet conveyor, a movable endless side guide or register, a first folding mechanism, a first transfer mechanism for delivering sheets from the first folding mechanism to a second folding mechanism, a third folding mechanism receiving sheets from the second folding mechanism, a second transfer mechanism for delivering the sheets from the third folding mechanism to a fourth folding mechanism, and a stacker selectively movable to receive the sheets either from the first folding mechanism or the fourth folding mechanism. These instrumentalities will be described, in the order named, and they are preferably mounted, constructed, and operated as follows.

Main Frame and Driving Mechanism

*Figs. 1, 1a, 6, 9, 10, 12, 16, 17, 19, 23, 28, and 40*

The main frame of the machine comprises side frame members 5 and 6 and an intermediate frame member 7 extending between said side frame members in spaced parallel relation therewith. These frame members are connected together by stay shafts 8 and 9, and cross members 10, 11, and 12. Said stay shafts and cross members are bolted or otherwise suitably secured to the frame members connected therewith, and extend transversely of said frame members as clearly shown in the drawings. Cross members 11 and 12 are of angular formation in cross section, to facilitate the attachment thereto of devices hereinafter described. The main frame is bolted or otherwise suitably secured to the machine foundation 13, and supports various instrumentalities employed to convey, register, fold and deliver sheets. The movable parts of said instrumentalities, together with a feeder for a supply of sheets, are all preferably driven from a common source of power, herein shown as an electric motor 14 that is bolted or otherwise suitably secured at 15 to the machine foundation 13.

The motor 14 is supplied with current from any suitable source through leads enclosed in a conduit 16. Said motor is started and stopped, as desired, by a switch 21. Fixed on the armature shaft 17 of the motor 14 is a pulley 18 around which passes a belt 19 that also passes around a pulley 20. The pulley 20 is fixed on a shaft 22 that extends transversely of the machine and is journalled in suitable bearings on the side frame members 5 and 6 thereof. The shaft 22 is thus driven continuously by the motor 14 when the latter is started through the medium of the switch 21.

Fixed on the shaft 22 is a hand wheel 23 by means of which the shaft 22 and the various mechanisms connected therewith may be turned or operated manually, when desired. The shaft 22 also has fixed thereon a bevel pinion 24 which meshes with a similar pinion 25 that is fixed on a forwardly and downwardly inclined shaft 26 at the upper end thereof. The shaft 26 is journalled in suitable bearings on the side frame member 6, and fixed on the lower end of said shaft is a bevel pinion 27 that meshes with a similar pinion 28. The bevel pinion 28 is fixed on one of a pair of trunnions 29 of a knurled roller 530, 530' that extends transversely of the machine and is journalled in suitable bearings on the frame members 5, 6 and 7 thereof. Fixed on the trunnion that carries the pinion 28, and preferably formed integrally with the latter, is a sprocket 30 around which passes a chain 31. This chain 31 also passes around a sprocket 32 that is fixed on a stub shaft 33 journalled in a suitable bearing on the side frame member 6. Fixed on the stub shaft 33, and preferably formed integrally with the sprocket 32, is a bevel pinion 34 which meshes with a similar pinion 35 that is fixed on a stub shaft 36. The stub shaft 36 is journalled in a suitable bearing on the side frame member 6, and said stub shaft is connected, as by a universal coupling 37, with one end of an upwardly and rearwardly inclined shaft 38. The shaft 38 is journalled in suitable bearings on the side frame 6 and on the frame 39 of a sheet feeder which is operated by said shaft and serves to feed a supply of sheets 40.

Sheet Feeder

Figs. 1, 1a, 7, and 17

The sheet feeder may be of any suitable type, but as herein shown is preferably of the type disclosed in Patent No. 1,521,365, granted December 30, 1924 to L. J. Frohn. Accordingly, the sheets 40 are fed from an upper feed board 41, around a feed drum 42, and over a lower feed board 43. The feed boards 41 and 43 are supported in any suitable manner on the frame 39, and the feed drum 42 extends transversely of said frame and is journalled in suitable bearings thereon. The sheets 40 are fed by tapes 44, 45, and 46 which are associated with the upper feed board 41, the feed drum 42, and the lower feed board 43, respectively. The tapes 44 pass over and under the upper feed board 41, around the feed drum 42, and around rollers 47 and 47' journalled on the forward end of said upper feed board and the frame 39, respectively. The tapes 45 pass around rollers 48, 49, 50, and 51 which extend transversely of the frame 39 and are journalled in suitable bearings thereon. The tapes 45 press the sheets against the feed drum 42, and form a throat 52 that may be opened, when desired. For this purpose, the roller 48 is mounted on a swinging frame 53 that is pivoted on the shaft of the roller 49 and moved, when desired, by a handle 54. The tapes 46 pass over and under the lower feed board 43 and around rollers 51, 55, and 56. The roller 55 is fixed on a shaft 57 extending transversely of the frame 39 and journalled in suitable bearings thereon. The roller 56 is fixed on a shaft 58 extending transversely of the frame 39 and journalled in suitable bearings thereon.

The feeder, as before stated, is driven by the shaft 38 through the described connection therefor with the motor 14. For this purpose, the shaft 38 has fixed on the upper end thereof, a bevel pinion 59 which meshes with a similar pinion 60. The bevel pinion 60 is fixed on a stud shaft 61 extending transversely of the shaft 38 and journalled in a suitable bearing on the frame 39. Fixed on the stud shaft 61 is a spur pinion 62 that meshes with an idler pinion 62' which in turn meshes with an idler pinion 62''. These idler pinions are journalled in any suitable manner on the frame 39, and the idler pinion 62'' meshes with a spur gear 63 which is fixed on a shaft 64 at one end thereof. This shaft 64 extends transversely of the frame 39 and is journalled in suitable bearings thereon. Fixed on the shaft 64, at the end thereof opposite that carrying the gear 63, is a cam 65. This cam 65 is adapted to engage a roller 66 journalled on one arm 67 of a bell crank 68 the other arm of which is indicated at 69. This bell crank is loosely mounted on the shaft 57 and carries a pawl 70 adapted to engage a ratchet 71 that is fixed on said shaft. The shaft 57 also has fixed thereon a sprocket 72 around which passes a chain 73. The chain 73 also passes around a sprocket 74 that is fixed on a shaft 75 journalled in a suitable bearing on the frame 39 and carrying the roller 51. This shaft 75 has fixed thereon a gear 76 which meshes with an idler gear 77 that is journalled on the frame 39. The idler gear 77 meshes with a second idler gear 78 that is also journalled on the frame 39. This idler gear 78, in turn, meshes with a gear 79 that is fixed on the feed roller 42 or the shaft therefor.

The sheets on the lower feed board 43 are separated and forwarded by a suction wheel indicated at 80 and fixed on the shaft 64 to rotate therewith. The wheel 80 is operated and controlled as disclosed in Patent No. 1,521,365 above referred to, and since said wheel and the suction supplying and controlling devices therefor form, per se, no part of the present invention, it is unnecessary to describe them in detail. The shaft 64 and the bell crank 68 are rotated continuously and rocked intermittently, respectively, and as the sheets are separated and forwarded by the sheet separating means 80 and the sheet forwarding means 81, the pawl 70 is intermittently engaged with the ratchet 71 to intermittently advance the sheets 40. Intermittent engagement of the pawl 70 with the ratchet 71 is controlled by mechanism such as disclosed in Patent No. 1,521,365 and including a member 82 which, in the absence of sheets at the wheel 80, rocks a finger 83 out of engagement with a spring and cam controlled rod 84, thus releasing a rod 84' connected with the bell crank 68 so that the latter is operated by cam 65 to engage the pawl 70 with the ratchet 71. The shaft 57 is thus rotated, and the belts 46 are positively driven to advance the sheets along the lower feed board 43.

The chain 73 is also driven when the shaft 57 is rotated and acts, through the described driving connections for said chain with the feed drum 42, to drive the latter. The belts 44 and 45 will thus be driven by the feed drum 42 and the roller 51. When the sheets 40 have been advanced sufficiently, the member 82 is lifted, thus engaging the finger 83 with rod 84 and stopping the operation thereof so that it holds rod 84' and bell crank 68 against movement. The feeder is thus stopped until sheets under wheel 80 have been separated and forwarded thereby, whereupon the feeder is started, as before described.

The sheets are advanced successively by the wheel 80 between a feed roller 85, and drop rollers (not shown) and a disk 86 arranged above said feed roller and cooperating therewith. The roller 85 is fixed on a shaft 87 extending transversely of the frame 39 and journalled in suitable bearings thereon. The shaft 87 and the roller 85 are driven from the idler pinion 62' by a gear 88 which is fixed on said shaft and meshes with said idler pinion. The disk 86 is journalled on an arm 93 pivoted on a bracket 94 secured to the frame 39, and said arm has pivoted thereon an arm 98 which carries an adjusting device 95 engaging a projection of arm 93. The arm 98 has journalled thereon a caliper 96 provided with pins 97 and resting on the feed roller 85. If more than one sheet at a time is fed between the roller 85 and the caliper 96, the latter will be moved to throw the feeder out of operation.

Rotatably mounted on the frame 39 is a rock shaft 125 having fixed thereon an arm 126 pivotally connected with one extremity of a link 99 the opposite extremity of which is slidably connected with an arm 100 that is fixed on a shaft 101. The shaft 101, in turn, is journalled in arms 102 secured to or formed integrally with brackets 103 that are bolted or otherwise suitably secured, as at 104, to side members 105 of a main conveyor frame that is pivotally mounted on a shaft 106. This shaft 106 extends transversely of the side frame members 5 and 6, and said shaft is journalled in suitable bearings on said side frame members. The side members 105 of the pivoted conveyor frame carry a sheet conveyor and a sheet guide, hereinafter described, and during the normal operation of the machine, said side members rest on, and are supported by, arms 107 which are secured to, or formed integrally with, the side frame members 5 and 6, and project rearwardly therefrom as clearly shown in the drawings.

Extending between pins 109 carried by an arm 108 fixed on shaft 101, is a horizontally disposed control rod 110 the forward end of which is provided with an operating knob or handle 111. This control rod 110 is movably mounted on suitable means (not shown) carried by one of a pair of brackets 114. The brackets 114, in turn, are bolted or otherwise suitably secured, as at 115, on the side frame members 5 and 6. Fixed on the control rod 110, rearwardly of the arm 108 and the pins 109, is a collar 116.

The rear extremity of the control member 110 is pivotally connected with an arm 127 that is fixed on the rockshaft 125. The rockshaft 125 also has fixed thereon an arm 128 which is engaged by the pins 97 when the caliper 96 is operated. The shaft 125 is thus rocked to close a valve 129 connected by a link 129' with an arm 130 that is fixed on said shaft. This valve 129 controls the suction in the wheel 80. The valve 129, and the connections therefor with a source of suction and with the wheel 80 are substantially the same as disclosed in Patent No. 1,521,365 above referred to, and it is therefore unnecessary to describe the same in detail.

It is pointed out, that if more than one sheet at a time is fed between the feed roller 85 and the caliper 96, the caliper will be moved upwardly and acts, through the described connections therefor with the valve 129, to operate said valve so that suction is cut off in the suction wheel 80, thus throwing the feeder out of operation. When the trouble has been remedied, the feeder may be thrown into operation, by pulling the control rod 110 to open the valve 129. When the control rod 110 is pulled to open the valve, the shaft 125 and parts thereon are rocked, the caliper 96 and the link 99 are reset, the collar 116 engages the pins 109 on arm 108 to rock shaft 101, and a pawl 117 on shaft 101 engages a detent 118 on link 99 and prevents accidental displacement of the shaft 101 and the parts carried thereby. The pawl 117 is pivoted at 119 on the arm 100 that is fixed on the shaft 101. This pawl 117 has an arm 121 that engages a stop 122 on the arm 100. The detent 118 is formed on a small bracket 123 that is adjustably mounted, as by a set screw 124, on the link 99. The valve 129 may be operated to stop the feeder and start it, as desired, by manually operating the control rod 110 or a handle 120 that is fixed on rockshaft 125.

In the normal operation of the feeder, the sheets are separated and advanced successively by the wheel 80 between the feed roller 85 and the drop rollers (not shown). Passing around and driven by the feed roller 85 are tapes 131 which also pass around a roller 132. The roller 132 is fixed on a shaft 133 that extends transversely of, and is journalled in, suitable bearings on extensions 134 of frame 39. The frame 39 is provided with legs 135 bolted or otherwise suitably secured to the machine foundation 13. Extending over the tapes 131 are top rods 136 supported on cross members 137. The cross members 137 extend transversely of the tapes 131 and are supported from the arms 134 in any suitable manner. The top rods 136 prevent the sheets from being accidentally displaced upwardly from the tapes 131, and said tapes carry the sheets forwardly in succession and deliver them in like manner to a sheet conveyor which is preferably operated and constructed as follows.

SHEET CONVEYOR

*Figs 1, 1a, 6, 10, and 11 to 17, inclusive*

The sheet conveyor serves to deliver the sheets to folding mechanism which is mounted on the side frame members 5 and 6, and which will be hereinafter described. Said conveyor is preferably driven from the shaft 22. Accordingly, the bevel pinion 24, which is fixed on the shaft 22, meshes with a similar pinion 138 that is fixed on the lower end of an upwardly and forwardly inclined shaft 139. This shaft 139 is journalled in suitable bearings on the side frame member 6, and fixed on the upper end of said shaft is a bevel pinion 140 which meshes with a similar pinion 141. The bevel pinion 141 is fixed on the shaft 106 on which the side frame members 105 of the conveyor are pivotally mounted. The shaft 106 also has fixed thereon a sprocket 142 around which passes a chain 143. The chain 143 also passes around a sprocket 144 that is journalled on a stud 145. The stud 145 is fixed on one of a pair of extensions 146 that depend downwardly from, and are preferably formed integrally with, the brackets 103. The stud 145 has adjustably secured thereon an arm 147 provided on the free end thereof with an idler sprocket 148 that engages the chain 143 to take up the slack therein.

Rotatably mounted on the stud 145 is a spur gear 149 which is formed integrally with the sprocket 144 and meshes with a similar gear 150 that is fixed on a shaft 151. This shaft 151 extends transversely of the conveyor and is journalled in suitable bearings on the extensions 146 of the brackets 103. Fixed on the shaft 151, and adjustable therealong to various positions, are pulleys 152 around which pass tapes 153. The tapes 153 receive the sheets from the tapes 131, and carry said sheets therefrom to sheet folding mechanism which is indicated broadly at 154 and mounted on the side frame members 5 and 6. The tapes 153 extend diagonally of the normal line of travel of the sheets to said folding mechanism, so that said sheets are brought up against a moving endless side guide 155 which registers the sheets with said folding mechanism. In accordance with the present invention, the side guide 155 may be selectively positioned at one side or the other of the conveyor frame 105, and the tapes 153 may be adjusted to move the sheets laterally to one side or the other of said conveyor frame in accordance with the position of the side guide 155. In order to reduce to a minimum, the space existing between the tapes 153 and the folding mechanism 154, and in order to facilitate adjustment of the tapes 153 in accordance with the position of the side guide 155, the tapes 153 are, in accordance with the present invention, mounted on adjustable auxiliary frames 156 carried by the main conveyor frame and movable thereon to adjust the position of the tapes 153 without disturbing the driving connections therefor with the pulleys 152. Accordingly, the auxiliary frames 156 have secured to or formed integrally therewith, extensions 157 that rest on bars 158 extending transversely of the main conveyor frame and secured to the side frame members 105 thereof, as by machine screws 159. Passing through suitable openings in the extensions 157 of auxiliary frames 156, are machine screws 160 the lower ends of which have threaded engagement with the walls of suitable openings formed in clips 161 that secure the frames 156 in the desired positions of adjustment on the bars 158.

The frames 156 have journalled thereon pulleys 162, and the extensions 157 have journalled thereon pulleys 163. The tapes 153 pass over the pulleys 162 and 163, and the upper reaches of said tapes are supported by guides 164 that are bolted or otherwise suitably secured, as at 165, to the extensions 157 of the auxiliary frames 156. Adjustably secured, as at 166, on the auxiliary frames 156, are arms 167 the free ends of which carry rollers 168 engaging the tapes 153 to take up the slack therein.

In order to adjust the tapes 153, the machine screws 160 are loosened and the frames 156 are shifted diagonally of the normal path of travel of the sheets, so that said sheets while being moved forwardly by the tapes 153 will be moved laterally thereby in engagement with the endless side guide 155. The auxiliary frames 156 and the tapes 153 are secured in their adjusted positions by tightening the machine screws 160 so that the clips 161 clamp the extensions 157 of the frames 156 on the rods 158. The frames 156, as shown in Fig. 11 of the drawings, are adjusted so that the tapes 153 direct the sheets laterally toward the far side of the main conveyor frame and against the endless side guide 155. If it is desired, however, to position the endless side guide 155 on the near side of the main conveyor frame, the auxiliary frames 156 could be adjusted to the full line positions thereof shown in Fig. 16, so that the tapes 153 would move the sheets laterally toward the near side of the main conveyor frame and against the endless side guide. In either case, adjustment of the frames 156 and the tapes 153 will not disturb the driving connections for the latter with the pulleys 152, for the reason that the tapes will merely be twisted slightly between the pulleys 152 and the pulleys 162, as clearly shown in Figs. 12, 13, and 17 of the drawings. The tapes 153 are therefore continuously maintained in engagement with the pulleys 152, 162, 163, and the rollers 168. The movable endless side guide 155 may, as before stated, be selectively employed at either side of the main conveyor frame 105, and said movable endless side guide is preferably operated and constructed as follows.

MOVABLE SIDE GUIDE

*Figs 10 to 17, inclusive*

The movable endless side guide 155 is driven from the gear 149 which, as before stated, meshes with the gear 150 and drives the pulleys 152 and the tapes 153. This gear 149 also meshes with a gear 169 that is fixed on a shaft 170. The shaft 170 extends transversely of the main conveyor frame and is journalled in suitable bearings on the extensions 146 of the brackets 103. Fixed on the shaft 170 is a bevel pinion 171 which meshes with a similar pinion 172 that is fixed on a vertical stub shaft 173 at the lower end thereof. This stub shaft 173 is journalled in a suitable bearing on a base plate 174 which, in turn, is supported on track bars 175 extending transversely of the main conveyor frame and secured, as by machine screws 176, to web-like extensions 177 of the brackets 103. One of these track bars 175 engages abutments 178 (Fig. 12) formed on the arms 107 that support the conveyor in its normal, operative position shown in full lines in the drawings. It will appear, however, that the main conveyor frame, and all parts carried thereby, may be swung up to inoperative positions, indicated in dotted lines in Fig. 1 of the drawings, and there locked by any suitable means for this purpose.

The base plate 174 carries the movable, endless side guide 155, and said base plate and said side guide are secured in position on the track bars 175 by a machine screw 179 and a clip 180. The machine screw 179 passes through a suitable opening in the base plate 174, and has an enlarged shank 181 rotatably mounted on the top of said base plate and provided with an operating handle 182. The clip 180 is provided with a suitable opening the wall of which has threaded engagement with the machine screw 179. By turning the handle 182 in one direction, the clip 180 and the base plate 174 are clamped tightly against the track bars 175 at opposite sides thereof, respectively. By turning the handle 182 in the opposite direction, the base plate and clip may be unclamped so that said plate and the movable side guide 155 may be adjusted along the track bars 175 to various positions, and there held by the screw 179 and the clip 180, as before described. The shaft 170 extends through a suitable opening in an extension 183 of the base plate 174. The pinion 171 is keyed to the shaft 170 in a groove 184 which extends longitudinally of said shaft and enables the pinion to be moved therealong with the base plate 174 and through the auxiliary frames 156, when the endless side guide is shifted from one side of the conveyor to the other.

The base plate 174 has secured to or formed integrally therewith, arms 185 having suitable openings in the free ends thereof for machine screws 186. These screws 186 pass through slots in a yoke 187 and serve to secure said yoke to the arms 185. Said slots enable the yoke 187 and the side guide thereon to be adjusted properly and retained against displacement by locking screws 188 threaded in suitable openings in the arms 185 and engaging the screws 186. The yoke 187 has secured to, or formed integrally therewith, arms 189 that carry a stationary sheet guide made in two parts 190, 191 arranged in spaced relation and between which each sheet on the tapes 153 passes in engagement with the movable, endless side guide 155. The guide member 191 has secured to or formed integrally therewith, clips 192 which are secured, as by small machine screws 193, to lugs 194 and 195 that are formed on the arms 189 of the yoke 187, respectively.

The lugs 194 and 195 are spaced along, and joined with, a flange 196 extending along the arms 189 and the yoke 187 and joined to webs or flanges 197 extending transversely of and formed integrally with the yoke 187. These webs 197 terminate in an enlarged boss 198 that is fitted over the shaft 173 that carries the bevel pinion 172. Said shaft, the pulley 204 and the pinion 172 are thus mounted on the yoke 187. The lower, stationary guide member 190 is bolted or otherwise suitably secured, as at 199, to a lug which projects rearwardly from the portion of the flange 196 that extends along the yoke 187. The lower, stationary guide member 190 is further secured, as by machine screws 200, to lugs 201 formed on arms 202 which project outwardly from the arms 189. The lugs 194, 195 have adjustably suitably secured thereto, a guide 203 for the movable endless side guide 155.

The movable side guide 155 passes around pulleys 204, 205, 206 and 207. The pulley 204 constitutes the driving pulley for the movable side guide 155, and is fixed on the shaft 173 above the boss 198 of the yoke 187. The pulley 205 serves to adjust and maintain tension on the driven endless side guide 155, and is journalled on an arm 208. The arm 208 is adjustably secured, as at 209, on the base plate 174. The pulleys 206 and 207 are journalled on the free ends of the arms 189, and the driven endless side guide passes over the several pulleys and engages the guide 203.

In order to insure against accidental upward displacement of sheets fed by the tapes 153 to the folding mechanism 154, the conveyor including said tapes may, if desired, be provided with top rods 210. These top rods are adjustably secured, as at 211, on slotted bars 212 which extend transversely of the conveyor and are secured, as at 213, on the main conveyor frame. In order to change the position of the movable side guide 155 from one side to the other of the conveyor, the top rods 210 and the cross bars 212 are removed. This is accomplished by removing the fastening devices 213. When moving the side guide from the far side of the conveyor to the near side thereof, for example, the screws 186 are removed, whereupon the side guide 155 is displaced from the pulleys 204, 205, 206, 207 and the yoke 187 and parts carried thereby, are lifted from the base plate 174. The clip 180 is then released by turning the machine screw 179, whereupon the base plate 174 and the bevel pinion 171 are moved along the shaft 170 from the far side of the conveyor to the near side thereof through the auxiliary frames 156. The yoke 187 is then turned end for end and placed upon the base plate 174 so that the bevel pinion 172 is brought into mesh with the bevel pinion 171, whereupon the endless side guide 155 is placed upon the pulleys 204, 205, 206, 207, as shown in Fig. 16 of the drawings. The parts are then adjusted to bring the endless side guide 155 in proper position, whereupon the base plate is secured on the bars 175 by the clip 180 and the machine screw 179, and the yoke 187 is secured on said base plate by the screws 186 and 188. When the movable side guide has been repositioned, the top rods 210 and the cross bars 212 may be replaced and secured in position on the frame 105 by the fastening devices 213.

Alternative positions of the tapes 153 and the side guide 155 are illustrated in Figs. 11 and 16 of the drawings. In Fig. 11, for example, the side guide 155 is positioned at the far side of the main conveyor frame, and the auxiliary frames 156 and the tapes 153 are diagonally arranged on the main conveyor frame to feed the sheets along said frame and laterally in engagement with said side guide. In Fig. 16, however, the side guide 155 is positioned on the near side of the main conveyor frame, and the auxiliary frames 156 and the tapes 153 are reversely disposed to extend diagonally of said main conveyor frame and feed sheets longitudinally therealong and laterally against said side guide.

It will appear, from the foregoing, that when the side guide 155 has been positioned at one side or the other of the main conveyor frames 105, said side guide is continuously maintained in driving relation with the shaft 170, and may be continuously driven thereby. It will further appear, that regardless of the positions occupied by the auxiliary frames 156 and the tapes 153, the latter will be continuously maintained in driving relation with the pulleys 152 and may be shifted with said auxiliary frames without disturbing said driving relation. The tapes 153, as in the case of the movable side guide 155, are continuously driven during the normal operation of the machine, by the described driving connections for said tapes and said side guide with the continuously driven shafts 151 and 170, respectively. These shafts, in turn, are continuously driven, during the normal operation of the machine, by the described driving connections for said shafts with the main drive shaft 22.

It has previously been mentioned, that the sheet conveyor just described, may be swung up to and locked in, an inoperative position indicated in dotted lines in Fig. 1 of the drawings. Prior to movement of the conveyor to the inoperative position aforesaid, certain elements of a control mechanism hereinafter described are disconnected, together with the control devices 99, 110 normally connected with the sheet feeder. When these elements are disconnected, the main conveyor frame, the auxiliary frames 156, the tapes 153, the movable side guide 155, and the parts mounting and driving said side guide and said tapes, may be swung upwardly as a unit to inoperative positions without disturbing the driving connections for said tapes and said side guide with the shafts 151 and 170, respectively. It will thus appear, that the drive for the tapes 153 and the side guide 155 is not only maintained continuously when said parts are in their normal operating positions, but that said drive is continuously maintained when the main conveyor frame 105 is swung up to an inoperative position, or when the same is swung up or down for any other reason.

The tapes 153 and the driven endless side guide 155 serve to feed the sheets to, and register the same with, the folding mechanism 154, and said folding mechanism preferably comprises a series of loop folders adapted to make one or more parallel folds in the sheets, if desired. This first folding mechanism is preferably operated and constructed as follows.

FIRST FOLDING MECHANISM

*Figs. 1, 6, 10, and 17 to 22, inclusive*

The first folding mechanism 154 includes driven sheet feeding and folding rollers that are preferably operated through driving connections therefor with the shaft 106. For this purpose, shaft 106 has fixed thereon a gear 215 which meshes with an idler gear 216 that is journalled on a stud 217 secured in any suitable manner on one of the brackets 114. The gear 216 meshes with a gear 218 that is fixed on one of the trunnions 219 of a knurled roller 220 extending transversely of the side frame members 5 and 6. The trunnions 219 are journalled in fixed bearings on the brackets 114, and the gears 215, 216 and 218 are disposed inwardly of the bracket 114 which is secured to the side frame member 5. The sheets are fed between roller 220 and a knurled roller 221, by the tapes 153. The roller 221 has trunnions 222 one of which has fixed thereon a gear 223 that meshes with the gear 218. The rollers 220 and 221 are thus driven, in opposite directions, by the described driving connections therefor with the shaft 106.

The gear 223 meshes with a gear 224 that is fixed on one of the trunnions 225 of the knurled roller 226 which is driven opposite to the roller 221 by the described driving connections therebetween. The gear 224 meshes with a gear 227 that is fixed on one of the trunnions 228 of a knurled roller 229 which is driven opposite to the roller 226 by the described driving connections therebetween. The gear 227 meshes with a gear 230 that is fixed on one of the trunnions 231 of a knurled roller 232 which is driven opposite to the roller 229 by the described driving connections therebetween. The gear 230 meshes with a gear 233 that is fixed on one of the trunnions 234 of a knurled roller 235 which is driven opposite to the roller 232 by the described driving connections therebetween.

The knurled rollers just described, are arranged in an inclined bank or series intersecting a vertical plane passing centrally therethrough, and said bank or series of rollers are driven continuously through the described driving connections therefor with the continuously driven shaft 106. The knurled rollers are so related and operated, that their number may be reduced to a minimum while, at the same time, a maximum number of folds may be made by said rollers, in conjunction with grids and stops to be hereinafter described. For example, six knurled rollers are employed in the first folding mechanism, and these six rollers and associated devices, are capable of making four parallel folds in a sheet. The rollers of this first folding mechanism are independently movable into and out of position through openings 236 which are formed in the side frame members 5 and 6 and correspond substantially in configuration with the bank or series of rollers. The trunnions 219 of roller 220, as previously pointed out, are journalled in fixed bearings, whereas the trunnions of the remaining rollers of the bank or series are, in accordance with the present invention, journalled in interfitted adjustable, yieldable and floating or pivoted bearings which will now be described in detail.

Figure 19:
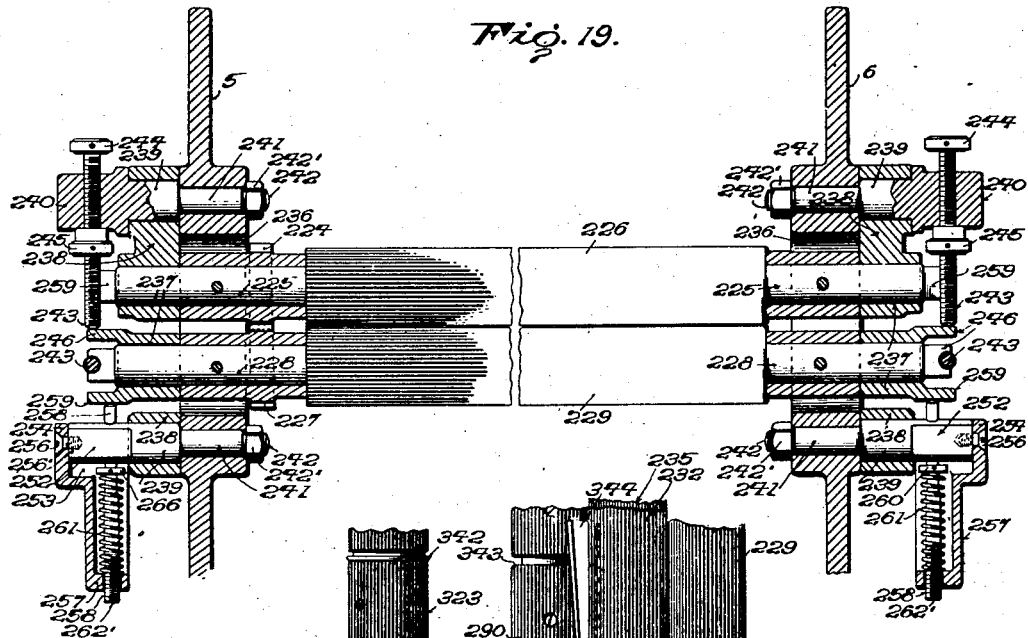
Fig. 19 is a transverse vertical sectional view on the line 19—19 of Fig. 17.
Figure 20:
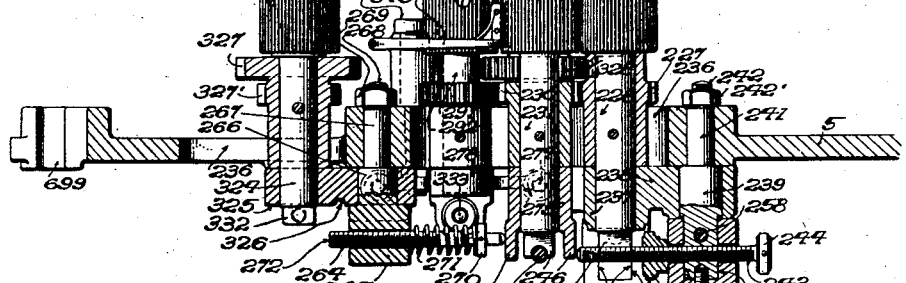
Fig. 20 is a fragmentary horizontal longitudinal sectional view on the line 20—20 of Fig. 17.

The trunnions 222, 225, 228, 231, and 234 of rollers 221, 226, 229, 232, and 235 are journalled in interfitted or nested floating bearings 237 having arms 238 that are pivotally mounted on stud bolts 239, the stud bolts supporting the rollers 221 and 226 having enlarged heads 240. The stud bolts 239 have reduced shanks 241 which extend through suitable openings in the side frame members 5 and 6, and threaded end portions 242 which receive nuts 242' that clamp said stud bolts in position on said side frame members (Figs. 17, 19, and 20). The stud bolts that support the bearings for the trunnions 222, 225, 228, and 231 of rollers 221, 226, 229, and 232, carry adjusting screws 243 which extend through suitable openings in said stud bolts and have threaded engagement with the walls thereof. These adjusting screws are provided with turning knobs and lock nuts which are indicated at 244 and 245 and located at opposite sides of the stud bolts, respectively, that carry said screws. The adjusting screws 243 bear against lugs or projections 246 formed on the bearings 237 for the trunnions 225, 228, 231, and 234 of rollers 226, 229, 232, and 235.

The bearings for the trunnions 222 of roller 221 have lugs or projections 247 thereon which are engaged by adjusting screws 248 (Figs. 1 and 17). These screws 248 extend through suitable openings in lugs 249 formed on the brackets 114. The adjusting screws 248 are provided with turning knobs and lock nuts which are indicated at 250 and 251 and located at opposite sides of the lugs 249, respectively. The stud bolts carrying the bearings for the trunnions 228, 231, and 234 of rollers 229, 232 and 235 have opposite flattened outer end portions 252 on which are fitted flattened inner surfaces 253 of enlarged heads 254 formed on spring and adjusting screw housings or caps 255 (Figs. 17, 19, 20, and 21). The caps 255 are retained in position by machine screws 256 which extend through suitable openings formed in the enlarged heads 254 and have threaded engagement with the walls of openings 256' formed in the ends of the stud bolts that carry said caps.

Extending through suitable openings formed in closed end walls 257 of the caps 255, are spring plungers 258. These spring plungers 258 engage lugs 259 formed on the bearings for the trunnions of rollers 221, 226, and 229. Secured to, or formed integrally with, plungers 258, are collars 260, and mounted on said plungers between said collars and the closed end walls 257 of the caps 255 are springs 261. The spring plungers 258 have threaded portions thereon for nuts 262 (Fig. 21) that may be employed to confine the springs and plungers in the caps 255 when the rollers carrying them are being moved into and out of position. The plungers 258 are provided with slots 262' for the reception of a tool for holding said screws when the nuts 262 are turned to compress the springs 261 and move the plungers 258.

The bearings for the trunnions 231 of roller 232 are provided with lugs 263 engaged by spring pressed plungers 264. The plungers 264 pass loosely through suitable openings in heads 265 and have threaded shanks to receive nuts (not shown) employed when assembling and disassembling the parts. The heads 265 are secured to or formed integrally with enlarged portions 266 of the shanks 267 of stud bolts 268. These stud bolts 268 pass through suitable openings formed in the side frame members 5 and 6 and are secured in position on said side frame members by nuts 269 threaded on the shanks 267 of the bolts 268. The plungers 264 have secured thereon collars 270, and mounted on said plungers between said collars and the heads 265 are springs 271. The plungers 264 are provided with grooves 272 to receive a tool by which the plungers may be turned in nuts (not shown) to compress the springs 271 and disengage said plungers from the lugs 263.

Figures 21, 22:
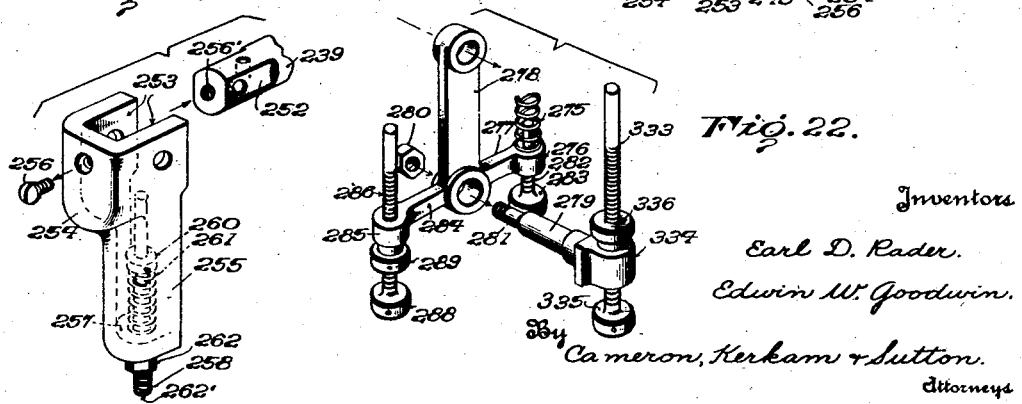
Fig. 21 is an enlarged detail perspective view of one of the bearing studs and spring caps or covers shown in Fig. 17, the parts being separated for purposes of clearer illustration.
Fig. 22 is a detail perspective view of one roller supporting and adjusting means shown in Fig. 17, the parts being separated for purposes of clearer illustration.

The bearings for the trunnions 234 of the roller 235 are provided with lugs or projections 273, having downwardly extending guides 274 (Fig. 17) over which are engaged the upper ends of roller supporting springs 275 that bear against washers 275' mounted on said guides and pressed by said springs against said lugs. The lower ends of the springs 275 bear against washers 276' pressed thereby against apertured bosses 276 formed on arms 277 of brackets 278. The brackets 278 are pivotally mounted on stud bolts 279 that extend through suitable openings in the side frame members 5 and 6 and are secured thereto by nuts 280 which are threaded on reduced shanks 281 of said stud bolts (Fig. 22). Extending through, and threaded in the walls of, the apertures of bosses 276 are adjusting screws 282 that receive the washers 276' and the lower ends of the springs 275. These screws 282 are provided with turning knobs 283 for moving said screws in opposite directions within the springs 275 to increase or decrease the tension thereof. The brackets 278 are further provided with arms 284 having apertured bosses 285 on the free ends thereof. Extending through, and threaded in, the walls of the apertures of bosses 285 are adjusting screws 286 which engage lugs 287 formed on the side frame members 5 and 6, respectively. The adjusting screws 286 are provided with turning knobs 288 and lock nuts 289 which enable said screws to be adjusted and locked, as desired. The screws 286 may be turned to swing the brackets 278 about the stud bolts 279 and thus move a knurled roller 290 into and out of operative relation with the knurled roller 235. The knurled roller 290 is made in sections fixed on a shaft 291 that is journalled in suitable bearings formed on the upper ends of the brackets 278. This shaft 291 has fixed thereon a gear 292. When the roller 290 is moved into operative relation with the roller 235, the gear 292 is brought into mesh with the gear 233 that is fixed on one of the trunnions 234. The roller 290 is thus driven opposite to the roller 235 by the gears 233 and 292.

It will appear, from the foregoing, that the bearings for the above described knurled rollers are interfitted or nested within each other, thus reducing to a minimum the amount of space required for both the rollers and the bearings. It will further appear that the various knurled rollers of the first folding mechanism are, through the described floating and pivoted bearings, assembled as a group instead of being assembled separately, and that the springs and the adjusting screws provided, enable the rollers to yield relatively while at the same time affording adjustments for said rollers independently of each other. It will further appear, that the yieldable and adjustable devices associated with the rollers are mounted on the bearings therefor, instead of being mounted separately therefrom, and that adjustment of any one or more of the rollers may be effected by devices mounted on the bearings of another roller or rollers. The arrangement and mounting of the rollers and associated devices, as previously pointed out, enables said rollers to be placed in a minimum amount of space and, moreover, reduces to a minimum the number of parts required to provide adjustment for, and yielding action of, the rollers. It will further appear, that the mounting of the rollers enables them to be quickly assembled and disassembled, and that the entire group of rollers, or any individual roller may, upon slight manipulation of bearings, adjusting screws, and devices associated therewith, be quickly moved into and out of operative position through either of the openings 236 provided in the side frame members 5 and 6.

The rollers 220, 221, 226, 229, 232, and 235 have associated therewith grids indicated broadly at 294. The rollers 220, 221, 226, and the grid associated therewith, constitute a first loop folding mechanism. The rollers 221, 226, 229, and the grid associated therewith, constitute a second loop folding mechanism. The rollers 226, 229, 232, and the grid associated therewith, constitute a third loop folding mechanism. The rollers 229, 232, 235, and the grid associated therewith, constitute a fourth loop folding mechanism. It will be understood, however, that the number of loop folding mechanisms employed in the first folding mechanism, may be increased or decreased as desired, by increasing or decreasing the number of knurled rollers and grids. The grids 294 and combined sheet stops and deflectors associated therewith, are identical in construction, and it is therefore only necessary to describe one of the same in detail.

Each grid is supported in inclined position on the side frame members 5 and 6, by lugs or brackets 295 formed integrally with or secured to said side frame members. The lugs or brackets 295 are formed in the upper sides thereof with recesses 296 that receive projections 297 formed on side members 298 of a lower grid plate 299. The lower grid plate 299 is secured in position on the lugs or brackets 295 by machine screws 300 or the like which pass through suitable openings in said lugs or brackets and have threaded engagement with the walls of openings formed in the projections 297 of the side members 298. The lower grid plate 299 is provided longitudinally thereof with sheet supporting members 301 arranged in spaced parallel relation and secured in any suitable manner to cross members 302. The sheet supporting members 301 each have a reduced end portion 303 curved at one side thereof and extending within the space defined by two of the associated rollers and in close proximity with one of the same. The cross members 302 are secured, as by machine screws 304, to the side members 298 of the lower grid plate.

The grid 294 further includes an upper grid plate 305 formed by a series of bars 306 substantially T-shaped in cross section and extending in spaced parallel relation longitudinally of the grid. The bars 306 are provided near opposite ends thereof with apertured bosses 307 through which extend rods 308. The bars 306 are secured in position on the rods 308 by set screws 309, and said rods, in turn, are slidably mounted on machine screws 310 or the like that pass through suitable openings in the ends of said rods. The heads of the machine screws 310 engage flattened surfaces 311 on the ends of the rods 308, and said machine screws extend in, and have threaded engagement with the walls of, suitable openings formed in bosses 312 projecting from the side members 298 of the lower grid plate 299. Mounted on the machine screws 310 between the bosses 312 and the rods 308, are small coil springs 313 that support the upper grid plate 305 in yielding relation with the lower grid plate 299. The bars 306 of the upper grid plate 305 have curved nose ends 314 extending into the space between two of the associated rollers, and in close proximity to one of the same.

In accordance with the present invention, the grid is provided with means movable thereon to form a combined sheet stop and sheet deflector. Said means is preferably constructed, mounted, and adjusted, as follows. Secured to, or formed integrally with, the two outermost sheet supports 301 at both sides of the lower grid plate 299, are ribs or bars 315. These ribs or bars 315 are shorter than the sheet supports 301 which carry them, and terminate in end portions 316 disposed rearwardly of, and in spaced relation with, the reduced ends 303 of said supports. Extending transversely of the lower grid plate 299 is a bar 317 that is slidable along the under sides of the ribs or bars 315 and along the portions of the supports 301 which project beyond the ends 316 of said bars or ribs 315. The bar 317 is provided adjacent opposite ends thereof with suitable openings in the walls of which are threaded adjusting screws 318 that pass through suitable openings in clips 319 positioned on the top surfaces of the sheet supports 301 which carry the bars or ribs 315.

Secured to, or formed integrally with the bar 317, are a series of arms 320 extending toward the associated rollers of the grid in the spaces between the supports 301 of the lower grid plate 299 and the spaces between the ribs 306 of the upper grid plate 305. These arms 320 have secured to or formed integrally with the free ends thereof, curved heads 321 that form a combined sheet stop and sheet deflector adjustable with the bar 317 along the grid to various positions. When the heads 321 are employed as a sheet stop, the bar 317 is moved to any desired position along the ribs or bars 315, and there clamped to said ribs or bars and the sheet supports 301 that carry them, by the adjusting screws 318 and the clips 319. In order to facilitate clamping of the bar 317 and adjustment of the same along the grid, the screws 318 may, if desired, be provided with operating knobs or handles 322. When the heads 321 are employed as a sheet deflector, the screws 318 are loosened, and the bar 317 is moved along the ribs or bars 315 past the ends 316 thereof and lifted under the portion of the sheet support 301 extending beyond said bars or ribs. The curved heads 321 are thus raised and the bar 317 and said heads are moved toward the rollers so that said heads are brought close to the intermediate roller of the series associated with the grid. The bar 317 is then clamped on the sheet support 301, by the adjusting screws 318 and the clips 319. When the heads 321 are employed as a sheet stop, the screws 318 are loosened, and the bar 317 is moved away from the rollers along the portion of the sheet support 301 extending thereto. The heads 321 are thus removed from the rollers whereupon the bar 317 and the heads 321 are lowered under the bars or ribs 315 and moved therealong away from the rollers to any desired position where they are clamped to the grid by the screws 318 and the clips 319. The heads 321 thus project in the spaces between the sheet supporting members 301 and the bars 306 and form a sheet stop for sheets delivered into the grid by the feeding rollers associated therewith.

The curved heads 321, as shown in Figs. 6 and 8 of the drawings, are positioned in the grids 294 to form sheet stops. When said heads are so positioned, the sheets pass between the six rollers and eight grid plates of the first loop folding mechanism, and receive four parallel folds. Tracing the path of a sheet, under these conditions, it passes from the tapes 153 between the rollers 220 and 221, and is fed thereby against the curved heads 321 on the first grid. The sheet is thus stopped, and the continued feeding action of the rollers 220, 221 buckles said sheet so that it is fed downwardly between, and folded by, the rollers 221, 226. The last named rollers feed the sheet into the grid of the second loop folding mechanism which includes the rollers 221, 226 and the roller 229. The sheet is stopped by the curved heads 321 on the second grid, and continued feeding action of the rollers 221, 226 buckles the sheet so that it is fed between, and folded by the rollers 226, 229. A second fold is thus made in the sheet parallel to the first fold, and the twice folded sheet is fed by the rollers 226, 229 into the third loop folding mechanism which includes said rollers, the roller 332, and the third grid associated therewith. The sheet is stopped in the third grid by the curved heads 321 thereon, and continued feeding action of the rollers 226, 229 buckles the sheet so that it is fed between, and folded by, the rollers 229, 232. A third fold is thus made in the sheet parallel with the first two folds. The rollers 229, 232 then feed the sheet into the grid of the fourth loop folding mechanism which includes said rollers, and grid and the roller 235. The sheet is stopped by the curved heads 321 on the fourth grid, and continued feeding action of the rollers 229, 232 buckles the sheet so that it is fed between, and folded by the rollers 232, 235. A fourth fold is thus made in the sheet parallel with the three folds previously made therein. The number of parallel folds made in the sheet could be increased, if desired, by increasing the number of folding rollers and grids.

Instead of making four or more parallel folds in the sheet, one, two, or three parallel folds could be made therein, or the sheet could be passed through the first folding mechanism without being folded. If it were desired, for example, to make three parallel folds in the sheet, the heads 321 on the first grid could be moved to the position shown in Fig. 18 of the drawings so that the sheet, instead of passing into said grid, would be deflected by said heads, without folding, between the rollers 221, 226. It is obvious, that in the making of three parallel folds, the heads 321 of either the second, third, or fourth loop folding mechanisms could be adjusted, as in the case of the first loop folding mechanism, to deflect the sheet through one of the loop folding mechanisms without folding.

If only two parallel folds were required, the heads 321 of two of the loop folding mechanisms could be adjusted to deflect the sheet therethrough without folding, and if only one parallel fold were desired, the heads of three of the loop folding mechanisms could be adjusted to deflect the sheet therethrough without folding. If it were desired to pass the sheet through the first folding mechanism without folding, the heads 321 of all of the loop folding mechanisms would be adjusted to deflect the sheet therethrough accordingly. When increasing or decreasing the number of folds made in the sheet by the first folding mechanism, the heads 321 of the respective grids could be selectively employed so that different folds, such as over and over, accordion, and various others, could be made.

The sheet, either folded, or unfolded, may pass from the first folding mechanism to a second folding mechanism, or said sheet, with one or more parallel folds made therein, could be delivered out of the machine without further folding. In the latter case, the roller 290 would be shifted to the left, as viewed in Fig. 1 of the drawings, by adjusting the screws 286 (Fig. 17) to swing the brackets 278 in the same direction. The gear 292 will thus be thrown out of mesh with the gear 233, and the roller 290, instead of being driven in a clockwise direction by the gear 233 of roller 235 and the gear 292 of roller 290, will be driven in a counter-clockwise direction by a roller 323, as hereinafter described. This roller 323 is made in sections fixed on a shaft 324 journalled in bearings 325 formed on arms 326 pivotally mounted on the enlarged portions 266 of the stud bolts 268.

In order to deliver the sheet out of the machine directly from the first folding mechanism, the roller 290 is shifted, as before described, and the roller 323 is swung over from the dotted line position thereof shown in Fig. 1, to the full line position therein shown. A gear 327 fixed on the shaft 324 is thus brought into mesh with a gear 328 that is fixed on one of the trunnions 234 of roller 235. At the same time, a gear 327' on the shaft of roller 323, is brought into mesh with the gear 292 on the shaft of roller 290, and the rollers 290 and 323 are thus driven in counter-clockwise and clockwise directions respectively to feed the sheet from the rollers 232 and 235 directly out of the machine onto intermittently driven tapes 329 of a stacker board 330. This stacker board is selectively movable to the dotted and full line positions thereof shown in Fig. 1 of the drawings, in order to receive the sheets from the first folding mechanism or from a fourth folding mechanism to be hereinafter described. The stacker board will be later described in detail.

The bearings 325 for the roller 323 have lugs or projections 331 and 332 secured to or formed integrally therewith. When the roller 323 is thrown over into operative relation with the roller 290, the lugs 331 engage adjusting screws 333 which support the roller 323 above the roller 290. These adjusting screws 333 extend through, and have threaded engagement with the walls of, suitable openings formed in heads 334 of the stud bolts 279. The adjusting screws 333 are provided with turning knobs 335 and lock nuts 336 at opposite sides of the heads 334, respectively. In the operative position of the roller 323, it may yield upwardly with respect to the roller 290 against spring pressed plungers 337 which are engaged with the lugs 332 when the roller 323 is swung over into position above the roller 290. These plungers 337 extend loosely through suitable openings formed in studs 338 rotatably mounted in suitable openings in the side frame members 5 and 6 and secured against displacement therefrom by any suitable means for this purpose. The plungers 337 are provided above the studs 338 with pull handles 339, and said plungers are provided below, and in spaced relation with said studs, with collars 340. The springs 341 for the plungers 337 are mounted thereon between the studs 338 and the collars 340. The plungers 337 are swung about the axis of the studs 338 when the roller 323 is moved into operative relation with the roller 290, whereupon said plungers may swing back to their normal vertical position to be engaged with the lugs 332, as by pulling the plungers upwardly through the medium of the handles 339 and thereafter releasing said plungers for engagement with said lugs. The spring pressed plungers 337 may likewise be pulled and swung to disengage them from the lugs 332 and enable the roller 323 to be swung over to its inoperative position illustrated in full lines in Fig. 17 of the drawings.

When the rollers 323 and 290 are positioned in operative relation with each other, as before described, the sheets are fed by the rollers 232 and 235, between rollers 323 and 290 which, in turn, feed the sheets forwardly and deliver them onto the intermittently driven tapes 329 of the stacker board 330. The stacker board 330 extends the entire width of the folding machine so that the sheets may be delivered from either side of the first folding mechanism in accordance with the position of the endless sheet guide 155 which registers the sheets with said mechanism. The sheet folded by the first folding mechanism may comprise a single signature, or said sheet may comprise a multi-part signature. In the latter case, it is desirable to separate the individual signatures of the multi-part signature as it passes through the first folding mechanism, and for this purpose slitters 342 are employed to sever the individual signatures of the multi-part signature. The slitters 342 are preferably fixed on the shaft of roller 323 at intervals along the same, and said slitters are adapted to cooperate with grooves 343 formed in the roller 290. It will thus appear, that when the roller 323 is swung over in position above the roller 290 to deliver the sheets from the first folding mechanism onto the stacker board 330, that the slitters 342 will slit the folded sheets as they pass between said rollers, and deliver parallel lines of individual signatures onto said stacker board.

In the event it is desired to pass the sheets either in folded or unfolded condition from the first folding mechanism to a second folding mechanism, the roller 323 is swung over to the full line position thereof shown in Fig. 17 of the drawings, and the roller 290 is swung by the brackets 278 and the adjusting screws 286 so that the gear 292 is engaged with the gear 233 of the roller 235. The rollers 290 and 235 are thus brought into operative relation, and a deflector 344 is swung into position between the rollers 232 and 290 so that sheets fed by the rollers 232 and 235 are deflected between the rollers 325 and 290 for delivery to the second folding mechanism above referred to. The deflector 344 is secured to or formed integrally with arms 345 that are pivotally mounted on stud bolts 346 extending through suitable openings in the side frame members 5 and 6 and secured thereto in any suitable manner. This deflector 344 is swung back to an inoperative position when the folded sheets are delivered directly from the first folding mechanism to the stacker board. When the sheets are to be delivered to the second folding mechanism, however, the deflector is swung into position between the rollers 232 and 290, as previously described. Delivery of the sheets from the first folding mechanism to the second folding mechanism is accomplished by a first transfer mechanism which is preferably mounted, constructed, and operated as follows.

FIRST TRANSFER MECHANISM

*Figs. 1, 3, 6, 9, 10, 23, 24, 26, 28, 39, and 40*

The first transfer mechanism preferably comprises normally fixed parts and normally movable parts, respectively. The normally fixed parts of said transfer mechanism are mounted on the cross members 11 and 12 which form parts of the connections between the side frame members 5 and 6. The cross member 11 has secured to or formed integrally therewith a bar or flange 347 that extends transversely of the machine with said cross member. The bar 347 is provided centrally thereof with a suitable opening, and extending through said opening and having threaded engagement with the wall thereof, is a tubular screw 348 having an apertured head 349 which bears against one side of the bar 347 (Fig. 24). Threaded on the screw 348, at the opposite side of the bar 347, is a hollow cap 350 having an annular flange 351. Pivotally mounted on the cap 350 between the flange 351 and the bar 347, is a bar 352 that extends transversely of the machine along the bar 347. This bar 352 is provided with bosses 353 on which are mounted sheet stops 354 that are spaced apart longitudinally of the bar 352. The sheet stops 354 are secured to the bosses 353, as by machine screws 355, and said sheet supports are adjustable with the bar 352 about its pivot on the cap 350, to level the sheet supports horizontally so that sheets received thereon are properly registered with second and third folding mechanisms to be hereinafter described. The sheet supports are maintained in proper position by locking devices which preferably include adjusting screws 356. The screws 356 pass through suitable openings in opposite ends of the bar 352, and are carried thereby. The screws 356 also pass through arcuate shaped openings 357 formed in the opposite ends of the flange or bar 347. The openings 357 enable the bar 352 and the sheet supports 354 to be rocked, as before described, on the cap 350, and after said bar and said supports have been properly positioned, they are locked by nuts 358 threaded on the ends of the screws 356 and bearing against the flange or bar 347.

The sheet supports 354 are provided longitudinally thereof with openings 359 shaped in conformity with corrugated guide plates 360 that extend loosely through said openings so as not to interfere with adjustment of the sheet supports 354 and the bar 362. The sheet supports 354 and the guide plates 360 are spaced apart and disposed at opposite sides of the second and third folding mechanisms above referred to, and the lower ends of said guide plates rest on the cross member 11. The guide plates 360 have upwardly and rearwardly flared ends 361 which are secured, as by machine screws 362, on the top flange of the cross member 12. Extending in spaced parallel relation with the guide plates 360, are guide rods 363. The lower ends of the guide rods 363 extend loosely through suitable openings 366 in the sheet supports 354. The upper ends of the guide rods 363 are flared, as at 364, and are supported at 365 by a cross bar 367. The bar 367 is secured to the cross member 12, as by nuts 368 and reduced screw threaded extensions 369 of studs 370 on said cross member.

The flared ends 361 and 364 of the guide plates 360 and guide rods 363 are disposed adjacent the bite of the rollers 235, 290, and said rollers, together with driven tapes 371, are adapted to feed sheets from the first folding mechanism, downwardly through the guide plates and guide rods, and onto the sheet supports 354 for folding by the second folding mechanism. The tapes 371 are driven by the roller 235 which, for this purpose, is provided with annular grooves 371' in which the tapes pass around said roller. The tapes 371 also pass around idler rollers 372 which are journalled on arms 373 adjustably secured, as by set screws 374, on a shaft 375. The shaft 375, in turn, is rotatably mounted in a bearing 375' provided on a bracket 376 secured to, or formed integrally with the center frame member 7 and extending upwardly therefrom at the rear of the tapes 371 (Figs. 6 and 40). The feeding reaches of the tapes 371 bear against guides 377 the upper ends of which are secured, at 378 to clips 381 on the cross member 12. Interposed between the tape guides 377 are sheet guiding strips 379 through which the knife 405 is reciprocated. Strips 379 extend in parallel relation with the tape guides 377 and are somewhat longer than the latter. The strips 379 and the lower ends of the guides 377 are connected together at 379' by clips 380 and the upper and lower ends of the strips 379 are secured at 378' to the clips 381 and the bar 347, respectively. The clips 381, in turn, are secured at 378, 378' to bosses 382 of the cross member 12. The guides 377 are disposed above the idler rollers 372, and the upper ends of said guides and the upper ends of the sheet guiding strips 379 are flared in conformity with the upper ends of the sheet guiding plates 360. Tension is maintained on the tapes 371 by spring pressed rods 382ᵃ the lower apertured ends of which are mounted on the shafts of rollers 372. The upper ends of rods 382ᵃ pass loosely through suitable openings in brackets 382ᵇ which are secured to or formed integrally with the guides 377 and project rearwardly therefrom. The springs 382ᶜ for the rods 382ᵃ are mounted thereon between the brackets 382ᵇ and collars 382ᵈ adjustably secured on said rods in any suitable manner. Sheets may, as before described, be fed from the first folding mechanism by the transfer mechanism, in position on the sheet supports 354 thereof, for folding by a second folding mechanism. This second folding mechanism is preferably operated and constructed as follows.

SECOND FOLDING MECHANISM

*Figs. 1, 4 to 6, inclusive, 9, 10, 23, 26 to 28, inclusive, 39 and 40*

Fixed on the shaft 22 is a spur pinion 383 which meshes with an idler gear 384 having secured to or formed integrally therewith, a spur pinion 385. The gear 384 and pinion 385 are journalled on a short stub shaft 386 secured to the side frame member 5 in any suitable manner. The pinion 385 meshes with a spur gear 387 which is fixed on a shaft 388 extending transversely of the machine and journalled in suitable bearings on the side frame member 5 and an arm 389 extending in parallel relation with the bracket 376 and having a bent portion secured thereto, as by machine screws 390. The shaft 388 is thus driven from the shaft 22, through the described driving connections therebetween. Fixed on, and driven by, the shaft 388 is an annular planetary gear housing 391 which has secured thereto, as by machine screws 392, an internal ring gear 393 (Figs. 4 and 5). This ring gear 393 meshes with planetary pinions 394 which are journaled on a ratchet wheel 395 loosely mounted on a sleeve 395' carried by a shaft 396. The shaft 396 extends in longitudinal alinement with the shaft 388 through the sleeve 395' and said sleeve and the shaft 396 are journalled in a suitable bearing 396' on the bracket 376. The ratchet wheel 395 and the planetary gear housing 391 are retained against axial displacement between bearing 396' and the arm 389.

Fixed on the shaft 396 at one end thereof is a spur pinion 397 which meshes with the planetary pinions 394. The shaft 396 has fixed on the opposite end thereof a cam 398 carrying a crank pin 399. This pin 399 is pivotally connected with one end of a link 400 the opposite end of which is pivotally connected with a pin 401 on a knife carrying head 402. This knife carrying head 402 extends in a vertical plane and is provided at its upper and lower ends with lugs 403. Secured to the lugs 403, as by bolts 404, 404' is a folder knife 405 which, together with the described operating devices therefor, constitutes the second folding mechanism. The bolt 404' extends through a slot 404'' in the knife 405, and said bolt and said slot provide for adjustment of the knife to proper position about a pivot formed by the bolt 404. This folder knife 405 extends vertically below the first folding mechanism and is adapted to make a fold in a sheet delivered therefrom at right angles to a fold or folds previously made in the sheet. The folder knife 405 will, however, make a fold in the sheet in the direction of the length thereof, in the event the sheet is delivered to said folder knife from the first folding mechanism without being folded thereby.

Reciprocating motion of the knife 405 is derived from the crank pin 399 above mentioned, and said motion is provided for by bearings 406 for a slidable tubular rod 407 the forward end of which has fixed thereon, as by a machine screw 408, the knife carrying head 402. The rod 407, the knife 405, and the head 402, are reciprocated as a unit through the link connection 400 for said head with the crank comprised by the cam 398 and the pin 399. The bearings 406 are formed on the bracket 376 of center frame 7, and in order to prevent the rod 407, the head 402, and the knife 405 from turning in said bearings, the head 402 is provided with a guide 409 engaged in a groove 410 formed in a plate 411 that is bolted or otherwise suitably secured on a shoulder 412 of the bracket 376. The guide 409 slides along the groove 410 of plate 411 during reciprocation of the knife 405, and said guide is secured to, or formed integrally with a strip 409' that is riveted at 413 to the knife 405.

Extending through a suitable opening formed in the rear end of the tubular rod 407, and having threaded engagement with the wall of said opening, is a tubular screw 414. Extending into the tubular rod 407 through the screw 414 is a rod 415 the outer end of which is secured, as at 416, to a bracket 417. The bracket 417, in turn, is bolted or otherwise suitably secured to the bracket 376 of center frame 7 at the rear thereof. Mounted on the rod 415 within the tube 407, is a spring 418 one end of which bears against the screw 414. The opposite end of the spring 418 bears against a collar 419 that is secured on the rod 415. When the crank comprised by the cam 398 and the pin 399 acts, through the described connections therefor with the knife 405, to move the latter forwardly, spring 418 is compressed. When the knife is moved rearwardly, spring 418 expands, and acts to hold said knife in its rearmost position and to hold said crank in a dead center position until the knife is again moved forwardly.

Movement of the knife 405 is controlled by the sheets delivered thereto from the first folding mechanism. The sheets so delivered successively engage and move sheet stops 420 which, through devices to be presently described, intermittently stop rotation of the ratchet wheel 395 and thus effect intermittent rotation of the shaft 396 and intermittent operation of said knife through the above described planetary gears and connections for the shaft 396 with the knife. The stops 420 move up and down in the space between the sheet supports 354, and said stops are secured to or formed integrally with arms 421. The arms 421 are fixed on a shaft 422 which is journalled in suitable bearings provided by brackets 423. The brackets 423 are secured to or formed integrally with the plate 411 and project forwardly and downwardly therefrom at opposite sides of the groove 410 for slide 409. One end of the shaft 422 projects within a box or housing 424 through a suitable opening in the wall thereof. This housing 424 has secured to or formed integrally with the back thereof, a bracket 425 (Fig. 2). The bracket 425 is bolted or otherwise suitably secured, as at 426, to an extension 427 of the plate 411. The box or housing 424 is provided on the front thereof with a plate or cover 428 removably secured to said box or cover, as by machine screws 429.

Arranged in the box or housing 424, is an arm 430 which is fixed on the shaft 422 (Fig. 26). This arm 430 has bolted or otherwise suitably secured thereto, a leaf spring 431 the free end of which engages an adjusting screw 432. The adjusting screw 432 is threaded through the top of the box 424 and provided exteriorly thereof with an operating knob 433. Pivoted at 434 on the arm 430, is an arm 435 provided on the free end thereof with a latch 436. This latch 436 is adapted to engage a detent 437 on the under side thereof. The detent 437 is bolted or otherwise suitably secured on one arm 438 of a bell crank lever 439. The bell crank lever 439 is journalled on a stud 440 projecting in the box 424 from the back thereof. The other arm 441 of the bell crank 439 is provided with a pin 442 over which is engaged one end of a spring 443. The opposite end of the spring 443 is engaged over a pin 444 on the latch 436. The spring 443 thus tends to maintain the latch 436 in engagement with the detent 437.

The detent 437 is adapted to engage a shoulder 445 formed on the forward end of a rod 446 projecting into the box 424 through a suitable opening formed in the rear end wall thereof. This rod 446 is pivotally connected at 447 with one arm 448 of a lever having a second arm 448' to which is secured a pawl 449. This lever, in turn, is pivotally mounted at 450 in the bearing 450' of the bracket 376 of center frame 7, and connected with the arm 448 of said lever is one end of a spring 451. The opposite end of the spring 451 is connected with the box 424 on the rear end thereof.

Extending into the box 424 through a suitable opening in the rear end wall thereof, is a rod 452. The forward end of this rod 452 extends in proximity to the latch 436. The rear end of the rod 452 is pivotally connected at 453 with one arm 454 of a bell crank 455. The other arm 456 of the bell crank 455 extends in proximity to an arm 457 that is secured to or formed integrally with the arms 448 and 448'. The bell crank 455 is fixed on one end of a rockshaft 458 which is journalled in suitable bearings 458' on the bracket 376 of center frame 7. The opposite end of the rockshaft 458 has fixed thereon an arm 459. This arm 459 has journalled on the free end thereof a roller 460 which is maintained in engagement with the cam 398 by a spring 461. The spring 461 is mounted on the rod 452, one end of the spring bearing against a collar 462 which is fixed on said rod, and the opposite end of the spring bearing against the rear end wall of the box 424.

When a sheet passes downwardly through the transfer mechanism from the first folding mechanism onto the supports 354 of the second folding mechanism, said sheet engages and depresses stops 420, thus rotating the shaft 422 in a counter-clockwise direction as viewed in Fig. 26 of the drawings. The latch 436 is thus lifted and disengages the detent 437 from the shoulder 445 of rod 446. The spring 451 then acts to engage the pawl 449 with the ratchet 395, thus stopping rotation of the latter and starting rotation of the shaft 396 through the described planetary gearing connecting the latter with the continuously rotating shaft 388. Cam 398, pin 399 and the shaft 396 then make one complete revolution during which the knife 405 is reciprocated a full stroke and folds the sheet by pushing it forwardly off the sheet supports 354 between guides 465 and a pair of driven rollers 463, 464 which form parts of the third folding mechanism to be presently described. The knife 405, in its reciprocating movement to fold the sheet as aforesaid, moves forwardly and rearwardly between the spaced opposed parts of the transfer mechanism, the sheet stops 420, and the guides 465 which are disposed immediately to the rear of the rollers 463, 464.

Near the end of the revolution of shaft 396, the high part of cam 398 engages roller 460 and swings shaft 458 so that arm 456 engages arm 457 and disengages pawl 449 from ratchet 395. At the same time rod 446, which was moved forwardly upon engagement of pawl 449 with ratchet 395, is now moved rearwardly and the spring 443 acts to cause detent 437 to engage shoulder 445 on rod 446, the coincident forward motion of arm 454 and rod 452 having pushed arm 435 forwardly and disengaged the latch 436 thereof from detent 437. The rod 446, which was moved forwardly upon engagement of pawl 449 with ratchet 395, is now moved rearwardly, and the spring 443 then acts to engage latch 437 with the shoulder 445 on rod 446, and to engage latch 436 with said detent. When the sheet has passed entirely off the stops 420, the spring 431 acts to reset said stops. The parts thus remain in their full line positions shown in Fig. 26 of the drawings, until the next sheet strikes the stops 420. The last named sheet then actuates said stops to set the second folding mechanism into operation as before described, and it will thus appear that the knife 405 is intermittently operated to fold the sheets as they are delivered successively onto the stops 420 and the sheet supports 354. Each sheet folded by the knife 405, in conjunction with the rollers 463, 464, may have a fold made therein parallel with the fold made by said knife and said rollers. This is accomplished by the third folding mechanism which will now be described in detail.

THIRD FOLDING MECHANISM

*Figs. 1, 6, 9, 23, 24, 26, 28 to 31, inclusive, 39 and 40*

The third folding mechanism, in accordance with the present invention, is movable into and out of operative relation with the preceding folding mechanism, and embodies, in addition to the knurled rollers 463, 464, a third knurled roller 466 and a grid 294' both of which are shiftable to one side or the other of the third folding mechanism to fold the sheets in either book or news imposition. The third folding mechanism is mounted on and swung by a frame 468 into operative and inoperative positions, and the roller 466 and the grid 294' are shiftable on said frame to one side or the other thereof as shown in Figs. 30 and 31. The third folding mechanism may, as previously pointed out, make a fold in the sheet parallel with the fold made therein by the second folding mechanism, or the sheet may be passed through the third folding mechanism without being folded thereby. The third folding mechanism is a loop folder corresponding substantially with each of the four loop folders of the first folding mechanism, but disposed at right angles thereto.

The drive for the rollers of the third folding mechanism is preferably derived from the roller 530, 530' which, for this purpose, has fixed on a reduced center portion 469' thereof, a bevel gear 469 that is positioned on said center portion at one side of a bearing 470 therefor. This bearing 470 is provided by an arm 471 secured to or formed integrally with the center frame member 7, there being another bearing 470' for the center portion 469' at the opposite side of the gear 469. The bearing 470' is formed on a bracket 470'' that is bolted or otherwise suitably secured to the center frame member 7 (Figs. 6, 23, and 25). The portion of the frame member 7 that passes over the roller 530, 530' is offset to provide a pocket 472, and in the normal or operative position of the third folding mechanism, one of the trunnions 473 of roller 463 extends downwardly through said pocket so that a bevel gear 474 fixed on said trunnion meshes with the bevel gear 469. The roller 463 is thus driven through the described driving connections for said shaft with the roller 530, 530'. The trunnions 473 of roller 463 are journalled in suitable bearings on brackets 475 extending over opposite ends of the roller 463. The brackets 475 are bolted or otherwise suitably secured, as at 475', to end plates 476 of the frame 468. The end plates 476 project with the brackets 475 at right angles to the frame 468, and said end plates are provided with guide pins 477 which are received in suitable openings formed in said brackets. The frame 468 is provided at the bottom thereof with curved arms 478 which embrace the center frame member 7 and are pivotally connected therewith at 479. In the normal or operative position of the third folding mechanism, the frame 468 and all parts carried thereby are supported on the pivot 479 and a seat 479' on the frame 7 (Fig. 40).

In the position of the parts shown in Fig. 29 of the drawings, the roller 466 is driven from one of the trunnions 473 which, for this purpose, has fixed thereon a spur pinion 480 that meshes with a spur pinion 481 fixed on one of the trunnions 482 of the roller 466. The trunnions 482 of the roller 466 are journalled in suitable bearings on arms 483 arranged to swing about pivots 484 on the brackets 475 so that the roller 466 may be moved to the positions thereof shown in Figs. 30 and 31 of the drawings. In either of these positions of roller 466, it is retained against displacement by spring pressed rods 485 which are pivotally connected at 486 with the arms 483. Corresponding ends of springs 487 on rods 485 bear against small washers 488 slidably mounted on the rods 485, and bearing against the arms 483, the opposite ends of said springs bearing against bosses 489 through which said rods pass outwardly of the frame 468. The bosses 489 are secured to or formed integrally with plates 490 and extend transversely thereof at an angle thereto and within openings 491 formed in the frame 468. The plates 490 are detachably secured, as at 492, to the frame 468 over the openings 491 therein, and the rods 485 are provided exteriorly of said plates with nuts 493 which serve to adjust the roller 466 with respect to the roller 463 or the roller 464. The springs 487 provide for yielding movement of the roller 466 relative to the roller with which it is associated, and during yielding movement of the roller 466, the rods 485 have a slight sliding motion in the bosses 489.

The roller 464 is driven from the roller 463, and for this purpose, the spur pinion 480 meshes with a spur pinion 494 that is fixed on one of the trunnions 495 of the roller 464. The trunnions 495 are journalled in suitable bearings 496 formed on arms 497. The arms 497 are pivoted at 498 on the brackets 75, and extend in spaced parallel relation with the arms 483 to provide clearance for the latter when they are swung about their pivots 484 to move the roller 466 into operative relation with the roller 463 or the roller 464. Secured to the arms 497 at the ends thereof opposite those carrying the roller 464, are pins 499 over which are engaged springs 500 corresponding ends of which bear against said arms. The opposite ends of springs 500 bear against shoulders 501 formed in the brackets 475. Secured to, or formed integrally with, the arms 497 at the end thereof carrying the roller 464, are bosses 502 in which are threaded adjusting screws 503 that bear against the brackets 475. The screws 503 are provided with nuts 504 for adjusting and locking them, and said screws and the springs 500 regulate the distance between the rollers 463, 464 and provide for relative yielding movement thereof, respectively.

The grid 294' has a combined sheet stop and deflector, as in the case of the grids of the first folding mechanism, and said grid and its combined sheet stop and deflector, are identical in construction with the grids and combined sheet stops and deflectors of said first folding mechanism. Accordingly, corresponding parts of the aforesaid grids and combined stops and deflectors, have corresponding reference characters except, that in the case of the grid 294' and its combined sheet stop and deflector, the reference characters therefor are primed. The grids and combined sheet stops and deflectors of the first folding mechanism having previously been described, and the same being identical in construction with the grid 294' and its combined sheet stop and deflector, it is therefore unnecessary to describe the latter in detail. The grid 294' and the roller 466, as previously pointed out, are shiftable from one side of the third folding mechanism to the other, in accordance with the character of fold to be made in the sheet, and the frame 468 is therefore provided at both sides thereof with means for supporting said grid. The grid supporting means on frame 468 preferably comprises supports 505 and 506 which are secured to or formed integrally with the brackets 475 and project from opposite sides thereof, respectively.

The supports 505 and 506 are provided with suitable openings 507 and 508, respectively, and in the position of the parts shown in Figs. 6, 9, and 30 of the drawings, the grid is mounted on the supports 505 and secured thereto, as by machine screws 509 (Fig. 6) which pass through the openings 507. When the parts of the third folding mechanism are positioned as shown in Figs. 9 and 30 of the drawings, the sheets folded one after another by the knife 405 and the rollers 463, 464 pass successively into the grid 294' and are buckled and folded in like manner by the rollers 463, 466 which deliver the sheets one after another from the left of the third folding mechanism to a second transfer mechanism indicated broadly at 512. This second transfer mechanism, in turn, delivers the sheets to a fourth folding mechanism, and said second transfer mechanism and the fourth folding mechanism will be later described in detail. The sheets may, however, be passed through the third folding mechanism and delivered from the left thereof to the second transfer mechanism without being folded in said third folding mechanism. In this event, the combined sheet stop and deflector of the third folding mechanism is positioned so that the heads 321' thereof extend between the rollers 464, 466 in close proximity with the roller 463, as indicated in dotted lines in Fig. 9 and full lines in Fig. 30, of the drawings. In this case, the sheets pass between the rollers 463, 464 and are deflected by the heads 321' between the rollers 463, 466 which deliver the sheets from the left of the third folding mechanism to the transfer mechanism 512 without the sheets being folded by said third folding mechanism.

In case it is desired to deliver the sheets from the third folding mechanism to the right thereof, the parts of said mechanism are positioned as shown in dotted lines in Fig. 9 and full lines in Fig. 31 of the drawings, and the transfer mechanism 512 is shifted to the dotted line positions thereof shown in Figs. 9 and 28 of the drawings. In this case, the sheets folded by the knife 405 and the rollers 463, 464 pass one after another into the grid 294' and are successively buckled and folded by the rollers 464, 466 which deliver the sheets in like manner from the right of the third folding mechanism to the transfer mechanism 512. When the roller 466 and the grid 294' are shifted to the positions thereof shown in dotted lines in Fig. 9 and full lines in Fig. 31 of the drawings, the sheets may be passed through the third folding mechanism and delivered from the right thereof to the transfer mechanism 512, without being folded by said third folding mechanism. In this case, the combined sheet stop and deflector on the grid 294' is positioned as indicated in full lines in Fig. 31 of the drawings, so that the sheets passing through the rollers 463, 464 are deflected by the heads 321' between the rollers 464, 466 which deliver the sheets one after another from the right of the third folding mechanism to the transfer mechanism 512 without being folded by said third folding mechanism.

Alternative delivery of the sheets from the left or the right of the third folding mechanism, is accomplished by removing the grid 294' from one side of said mechanism, and shifting the roller 466 to that side of said mechanism, and mounting the grid on the opposite side of the third folding mechanism. If, for example, it is desired to shift the grid 294' and roller 466 from the positions thereof shown in Fig. 30 of the drawings to the positions shown in Fig. 31 of the drawings, screws 509 are removed and the grid is displaced from the supports 505. The fastening devices 492 for the plates 490 are then removed, whereupon the rods 485 are pulled to swing the arms 483 about their pivots 484 and shift the roller 466 to the position thereof shown in Fig. 31 of the drawings. During shifting movement of the roller 466, the plates 490 are turned or reversed, and after said roller has been shifted into operative relation with the roller 464, the plates 490 are secured, as shown in Fig. 31 of the drawings, to the frame 468 by the fastening devices 492. The grid 294' is then positioned as shown in Fig. 31 of the drawings, by mounting said grid on the supports 506 and securing it thereto by the set screws 509. If, for example, it is desired to shift the roller 466 and the grid 294' from the positions thereof shown in Fig. 31 of the drawings to the positions shown in Fig. 30 of the drawings, the machine screws 509 are removed and the grid is displaced from the supports 506. The fastening devices 492 are then removed, whereupon the plates 490 are turned, and the rods 485 are pulled to swing the supports 483 about their pivots 484 so that the roller 466 is moved into operative relation with the roller 463, as shown in Fig. 30 of the drawings. The plates 490 are then secured in position by the fastening devices 492. The grid 294' is then positioned as shown in Fig. 30 of the drawings, by placing said grid on the supports 505 and securing it thereto by the machine screws 509.

It will appear, from the foregoing, that the third folding mechanism may be swung as a unit into and out of operative relation with the second folding mechanism, and that the drive for the movable parts of the third folding mechanism is automatically established and broken as the third folding mechanism is moved into and out of operative relation with said second folding mechanism, respectively. It will further appear, that the third folding mechanism is not only movable into and out of operative position, but that parts of said mechanism are selectively movable to one side or the other thereof to fold the sheets in book or news imposition or to deliver the sheets, without folding by the third folding mechanism to the right or left thereof for folding in book or news imposition by the fourth folding mechanism.

When it is desired to move the third folding mechanism to its inoperative position, said mechanism is swung to the left, as viewed in Fig. 6 of the drawings, about the pivot 479, and the drive for the movable parts of the third folding mechanism is automatically disconnected through disengagement of the bevel gear 474 from the bevel gear 469. This movement of the third folding mechanism to an inoperative position also releases devices that prevent operation of the knife 405 until said third folding mechanism is again moved into its operative position, whereupon these devices are actuated by the third folding mechanism to enable the knife 405 to operate as previously described. When the third folding mechanism is swung to inoperative position, it may, if desired, rest against a stop 513. This stop 513 is preferably comprised by a set screw threaded through the upper end of a bracket 514 that is bolted or otherwise suitably secured to the center frame member 7. The above mentioned devices for controlling the operation of the knife 405 through movement of the third folding mechanism to inoperative and operative positions, are preferably constructed, mounted, and operated as follows.

Slidably mounted in the screw 348 and the cap 350 is a plunger 515 the head 516 of which projects from the screw 348 forwardly of the head 349 thereof. This plunger 515 is provided with a reduced stem 517 extending rearwardly of the cap 350 through an opening 518 therein. Mounted on the stem 517 between the rear end of the cap 350 and a shoulder 519 provided at the junction of said stem with the plunger 515, is a coil spring 520 (Fig. 24). Mounted on the stem 517, rearwardly of the cap 350 is a plunger 521. This plunger 521 is rigidly secured, as at 522, on the stem 517, and engages a small lever 523 which is fixed on a shaft 524 that extends transversely of the machine. The shaft 524 is journalled in suitable bearings on the forwardly and downwardly projecting arms 423 of plate 411, and this shaft projects into the box 424 through a suitable opening in the innermost side wall thereof. Arranged in the box 424 and fixed on the shaft 524 is an arm 525 provided at its free end with a detent 526. The arm 525 has secured thereto a leaf spring 527 the free end of which engages a lug 528 secured to or formed integrally with the rear end wall of the box 424 and projecting therein as clearly shown in Fig. 26 of the drawings.

When the third folding mechanism is swung to its inoperative position, spring 520 forces the plunger 515 to the left, whereupon the leaf spring 527 rocks the shaft 524 in a clockwise direction as viewed in Fig. 26 of the drawings. The lever 523 is thus maintained in engagement with the plunger 521 and the detent 526 is engaged with a shoulder 529 formed on the rod 446. Engagement of the detent 526 with the shoulder 529 prevents operation of the mechanism for reciprocating the knife 405, so that regardless of whether or not sheets are delivered in front of the knife, it will not be operated when the third folding mechanism is swung away to its inoperative position.

When the third folding mechanism is swung into its operative position, however, the plunger 516 extends between guides 465 and is engaged by the lower bracket 475 which moves said plunger and the plunger 521 rearwardly with an accompanying compression of the spring 520. The lever 523 and the shaft 524 are thus rocked by the plunger 521 in a counter-clockwise direction as viewed in Figs. 24 and 26 of the drawings, and the detent 526 is disengaged from the shoulder 529 on the rod 446. The knife 405 will therefore be operated, as before described, when the sheets are delivered successively onto the stops 420 and the sheet supports 354. The third folding mechanism, when in its operative position, will hold the detent 526 away from the shoulder 529 until the third folding mechanism is again moved to its inoperative position, whereupon the spring 527 will act, as before described, to engage the detent 526 with the shoulder 529 and prevent movement of the knife 405 by its operating mechanism. It will thus appear, that the knife 405 can only be operated when the third folding mechanism is moved into its operative position. This affords, among other advantages, safety for the machine attendant if, for any reason, it is desirable or necessary to move the third folding mechanism to an inoperative position while the machine is running. Further, in the event sheets are to be passed directly out of the machine from the first folding mechanism, the third folding mechanism may be swung back to its inoperative position, thus automatically throwing the knife 405 and the third folding mechanism out of operation. The pivotal mounting of the third folding mechanism also has the advantage that in the event of "choke-ups" in the third folding mechanism or in the second or knife folding mechanism, the third folding mechanism may be swung to its inoperative position so that ready access may be had to either of said mechanisms for removal of "choke-ups" therefrom. Further, in the case of the third folding mechanism, removal of "choke-ups" therefrom is facilitated by a hand wheel 473' on one of the trunnions 473, and through the medium of which the rollers of the third folding mechanism may be turned to remove "choke-ups" therefrom.

The second transfer mechanism 512 which receives the sheets from the third folding mechanism will now be described in detail, and said transfer mechanism is preferably mounted, operated, and constructed as follows.

SECOND TRANSFER MECHANISM

*Figs. 6, 9, 28, and 32 to 39, inclusive*

The drive for the movable parts of the second transfer mechanism, is preferably derived from the knurled rollers 530, 531 or 530', 531' of the fourth folding mechanism above referred to. Accordingly, one of the trunnions 29 has secured thereto a spur pinion 532 which meshes with a similar pinion 533 that is fixed on one of the trunnions 534 of rollers 531, 531'. It will thus appear, that the trunnions 29 and 534 are rotated in opposite directions through the described driving connections therebetween. The trunnions 534 and the rollers 531 and 531' are supported as hereinafter described, and extend below the cross members 10 and 11 which connect the side frame members 5 and 6 together.

When the transfer mechanism 512 is positioned at one side or the other of the third folding mechanism to receive the sheets therefrom, pairs of driving wheels 535 engage the rollers 530, 531 or 530', 531', as the case may be, and are driven thereby. The driving wheels 535 are fixed on shafts 536 journalled in suitable bearings on the arms 537 of carriages 538. Fixed on the shafts 536 are bevel gears 539 which mesh with similar gears 540 that are fixed on vertical shafts 541 at the lower ends thereof. The shafts 541 are thus driven by the described driving connections therefor with the aforesaid rollers of the fourth folding mechanism. The carriages 538 are provided centrally thereof with suitable openings through which the shafts 541 loosely extend and said carriages are slidably retained on said shafts by collars 542 and 542' fixed on the shafts at opposite sides of the brackets. The collar 542' is part of the bevel gears 540. The shafts 541, in turn, extend loosely through suitable openings in a base plate 543 and a head plate 544 and are rotatably and slidably mounted in said openings and retained against displacement therefrom by collars 545. The collars 545 are fixed on the shafts 541 above the head plate 544, and said head plate and the base plate 543 are spaced apart and connected by square stay shafts 546 and round stay shafts 547, respectively. The square stay shafts 546 are provided at their upper ends thereof with reduced circular threaded ends 548 which pass through the openings in the head plate 544 and receive nuts 549 which secure said shafts to said head plate. The lower ends of the square shafts 546 are provided with reduced, circular, threaded ends 550 which pass through the openings therefor in the base plate 543 and receive nuts 551 which secure said shafts to said base plate. The ends 550 of the shafts 546 are, in turn, provided with reduced portions 552 which extend through suitable openings in the carriages 538 and thus prevent said carriages and the parts carried thereby from turning on the driven shafts 541.

The round stay shafts 547 are provided at their upper ends with reduced, circular, threaded extensions 547' that pass through openings therefor in the head plate 544 and receive nuts 553 which connect said shafts with said head plate. The lower ends of the stay shafts 547 are provided with reduced threaded extensions 547'' that pass through openings therefor in the base plate 543 and receive nuts 554 that secure said shafts to said base plate. The lower reduced end 547'' of one of the shafts 547 is further reduced to provide a stop 555 for a keeper plate 556 which extends transversely of and below the cross members 10 and 11 when the transfer mechanism 512 is positioned thereon. This keeper plate 556 serves to clamp the transfer mechanism 512 on the cross members 10 and 11 through the medium of a bolt 557 extending through a suitable opening in the base plate 543 and threaded into a suitable opening in the keeper plate 556.

The driven shafts 541 are provided longitudinally thereof with keyways 558 for the reception of key screws 559, or the like, that are carried by bevel gears 560 on said shafts and serve to drive said gears therefrom. The bevel gears 560 are rotated by the shafts 541 and said bevel gears mesh with similar gears 561 which are secured to or formed integrally with driven, inclined feed rollers 562 between which the sheets pass from the third folding mechanism. The rollers 562, in turn are journalled on inclined studs 563 that are secured to or formed integrally with spaced apertured arms 564 mounted on the stay shafts 547 and through which the latter pass. The arms 564 and the rollers 562 are supported in any desired position of adjustment on the shafts 547 by collars 565' joined together by webs 565 and embraced by the arms 564. The collars 565' are adjustably secured to the stay shafts 547, as by set screws 566, or the like.

In order to provide for yielding movement of the rollers 562, the uppermost arms 564 have threaded therethrough adjusting screws 567 the inner opposed ends of which receive expansion springs 568 that tend to throw the arms 564 outwardly away from each other and therefore swing the rollers 562 inwardly toward each other. These springs 568, however, allow the rollers 562 to yield relatively, in accordance with the thickness of the sheet passing therebetween and fed thereby, and the tension of said springs may be adjusted, as desired, by the screws 566 which, for this purpose, are provided with turning knobs 569.

The carriages 538 are provided on inner opposed sides thereof with projections 570 on which are mounted, as by machine screws 571, opposed spaced plates 572 that are flared upwardly and outwardly with respect to each other and provided with outwardly flared ends 573. These plates 572 provide a throat or passage into which the sheet is fed from the third folding mechanism, and said plates, together with guide rods 574, serve to guide the sheet between the rollers 562. The rods 574 have outwardly flared ends 575 directed toward the rollers of the third folding mechanism that feed the sheet to the transfer mechanism 512, and said rods are adjustably mounted, as at 576, on the bosses of collars 577 which, in turn, are adjustably mounted as at 578, on the stay shafts 547. The rods 574 may thus be adjusted to bring their flared ends 575 closer to or further away from the rollers 562 in accordance with adjustments of the transfer mechanism 512 closer to or further away from the third folding mechanism.

Extending between the rods 574 and located between the rollers 562 and the stay shafts 547 is a vertical sheet guide 579 the sheet engaging face of which is provided with a groove 580 into which the leading edge of the sheet enters when passing from the third folding mechanism to the transfer mechanism 512. This sheet guide 579 is pivotally mounted, as at 581, on the base plate 543, and extends downwardly through a suitable opening in said base plate, in close proximity with the rollers of the fourth folding mechanism. The sheet guide 579 extends upwardly through a suitable opening in the head plate 544, and may be adjusted into vertical position by an adjusting screw 582. This adjusting screw 582 is threaded through a suitable opening in the head plate 544, and said screw is provided with adjusting and locking nuts 583 and 584, respectively. After the sheet guide 579 has been adjusted in true vertical position, or at right angles to the bite of the feed rollers of the fourth folding mechanism, said sheet guide is locked by a set screw 585 threaded through a suitable opening in the head plate 544 and extending at right angles to the adjusting screw 582.

With the parts of the third folding mechanism, and the second transfer mechanism 512, in the positions thereof indicated in full lines in Fig. 75

9 of the drawings, the sheets will be fed from the third folding mechanism to the left thereof between plates 572 and rods 574 to the rollers 562. The rollers 562 seize each sheet and feed it laterally and downwardly on the sheet guide 579 to the feed rollers 530, 531 of the fourth folding mechanism. When the parts of the third folding mechanism are positioned as shown in Fig. 31 of the drawings, and the second transfer mechanism 512 is positioned as shown in dotted lines in Figs. 9 and 28 of the drawings, however, the sheets will be fed from the third folding mechanism to the right thereof between the rods 574, the plates 572, and the rollers 562. The rollers 562, in turn, will feed each sheet laterally and downwardly against the guide 579 into the bite of the feed rollers 530', 531' of the fourth folding mechanism. It will appear, from the foregoing, that the carriages 538 and the shafts 541 are slidably mounted on the frame of the transfer mechanism 512 and may have a floating action with respect thereto such that when the transfer mechanism is mounted in operative positions, the drive wheels 535 will always engage the rollers 530, 531 or 530', 531' to continuously maintain driving connections between the latter and the rollers 562 and insure continuous operation of said rollers.

The transfer mechanism 512 may, in accordance with the present invention, be shifted quickly from one side to the other of the third folding mechanism, and when positioned at either side thereof, is immediately brought into driving relation with the fourth folding mechanism, through engagement of the driving wheels 535 with the rollers 530, 531 or 530', 531' of said fourth folding mechanism. Accordingly, the second transfer mechanism 512 may be disconnected from the cross members 10 and 11, by loosening the screw 557 and the keeper plate 556, and transferring the entire mechanism 512, as by a handle 586, to the opposite side of the third folding mechanism. The handle 586 is secured to or formed integrally with the head plate 544, and the entire transfer mechanism 512 may be lifted by said handle and transported from one side of the machine to the other, or to any point to which it is desired to carry said transfer mechanism. When shifting the transfer mechanism 512 from one side of the third folding mechanism to the other side thereof, said transfer mechanism is reversed before being positioned on the cross members 10 and 11. When so positioned, the transfer mechanism 512 is clamped to said cross members by the screw 557 and the keeper 556, as before described.

The transfer mechanism 512, when positioned at either side of the third folding mechanism, may be adjusted to any desired position relative thereto, by sliding said transfer mechanism along the tracks or cross members 10 and 11. When making the last mentioned adjustments, the screw 557 and the plate 556 are loosened and tightened, as before described, to unclamp and clamp the transfer mechanism 512. The rods 574 may, if desired, be dispensed with in the event the transfer mechanism 512 is positioned close enough to the third folding mechanism to receive sheets therefrom without the necessity for guiding said sheets from said third mechanism to said transfer mechanism. In any case, it will appear, from the foregoing, that the sheets are fed from the third folding mechanism to the transfer mechanism 512 which, in turn, feeds the sheets laterally and downwardly on the guide 579 to the fourth folding mechanism above referred to. This fourth folding mechanism will now be described in detail.

FOURTH FOLDING MECHANISM

Figs. 1, 6, 9, 23, 25, 28, 32 to 34, inclusive, and 39

The fourth folding mechanism is preferably a loop folder extending at right angles to the third folding mechanism, and said loop folder includes, in addition to the knurled rollers 530, 531 and 530', 531', knurled rollers 587, 587' and a grid 294". The rollers 530, 531' constitute, in effect, a single roller extending across the entire width of the machine and having trunnions 29 journalled in suitable bearings on the side frame members 5 and 6 of the machine. The rollers 531 and 531' likewise constitute, in effect, a single roller extending across the entire width of the machine, having trunnions 534 and driven from the roller 530, 530' through the gears 532 and 533, as before described. The trunnions 534 are journalled in suitable bearings on arms 588 pivoted at 589 on the side frame members 5 and 6, said trunnions 534 passing through suitable slots 590 formed in said side frame members. The arms 589 have connected therewith, as at 591, spring pressed rods 592 that extend through suitable openings in stud bolts 593 secured in any suitable manner to the side frame members 5 and 6 forwardly of, and in spaced relation with, the arms 588. The springs 594 for the rods 592 are mounted thereon between the arms 588 and the studs 593, and said rods are provided forwardly of said studs with adjusting and locking nuts 600 and 600'.

A centrally reduced portion 534' of the roller 531, 531' is supported in a bearing 601 (Figs. 6 and 25) secured to, or formed integrally with spaced arms 602 that embrace the center frame member 7 and are pivotally connected therewith, as at 603. The bearing 601 has projecting forwardly thereof spaced ears 604 that are pivotally connected, as at 605, with the rear extremity of a spring pressed rod 606. This rod 606 extends forwardly of the bearing 601 through a suitable opening formed in a bracket 607 secured to or formed integrally with the center frame member 7 and projecting downwardly therefrom. The spring 608 for the rod 606 is mounted thereon between the bearing 601 and the bracket 607, and said rod is provided forwardly of said bracket with adjusting and locking nuts 609. It will appear, from the foregoing, that the described mounting of the trunnions 534 and the centrally reduced portion 534' of roller 531, 531' enables the latter to yield relatively to the roller 530, 530', and that this yielding movement of the roller 531, 531' may be regulated as desired through the medium of the spring pressed rods 592 and 606 and the adjusting nuts thereon.

The roller 587, 587' has trunnions 610 and is driven from one of the trunnions 534 through the gear 533 thereon. For this purpose, one of the trunnions 610 has fixed thereon a gear 611 which meshes with the gear 533 so that the roller 587, 587' is driven as aforesaid. The trunnions 610 are journalled in suitable bearings formed on arms 612 extending at right angles to the arms 588 and pivotally mounted, as at 613, on the side frame members 5 and 6. The trunnions 610 extend into the bearings on arms 612 through slots 614 in the side frame members 5 and 6, and the arms 612 have pivotally connected therewith, as at 614', the upper ends of vertical spring pressed rods 615. The spring pressed rods 615 extend through suitable openings in studs 616 that are secured in any suitable manner to the side frame members 5 and 6; and the springs 617 for said rods are mounted thereon between the shaft bearings of arms 612 and the studs 616. The spring pressed rods 615 are provided thereon below the studs 616 with adjusting and locking nuts 618 and 618'.

A centrally reduced portion 610' of roller 587, 587' is supported in a bearing 619 that is secured to or formed integrally with a link 620 between the opposite ends thereof (Figs. 6 and 25). One end of the link 620 is pivotally mounted, as at 621, on a stud 622 which, in turn, is carried by the bracket 470". This bracket 470", as previously described, is secured on the center frame member 7, and said bracket depends downwardly and forwardly therefrom adjacent the pocket 472. The bearing 619 is provided with a lug 619' through an elongated opening of which extends a rod 623. This rod 623 also passes through a suitable opening in the center frame member 7 and is retained against downward displacement therefrom by a head 624 which engages the top of said frame. Mounted on the lower end of the rod 623 are nuts 625 against the uppermost of which bears the lower end of a spring 626. This spring 626 is mounted on the rod 623 below the bearing 619 and the upper end of said spring engages the underside of the lug 619'. The rod 623 is provided thereon above the lug 619', with an adjusting nut 619". It will appear, from the foregoing, that the roller 587, 587' may yield relatively to the roller 531, 531' and that yielding movement of the roller 587, 587' may be regulated, as desired, by the adjusting nuts on the rods 615 and 623.

The grid 294" extends across the entire width of the machine between the rollers 530, 530' and 587, 587' so that sheets delivered from the second transfer mechanism 512 between the rollers 530, 531 or 530', 531' may, if desired, be directed into the grid 294" and folded by the rollers 531, 587 or 531', 587'. The grid 294" is provided with a combined sheet stop and deflector, and said grid and said combined sheet stop and deflector are identical in construction, mounting, and operation, as the grids and combined sheet stops and deflectors of the first and third folding mechanisms. Accordingly, corresponding parts of the aforesaid grids and combined sheet stops and deflectors are indicated by the same reference characters, except that in the case of the grid 294" and its combined sheet stop and deflector, said reference characters are double primed. The grid and associated elements of the fourth folding mechanism being identical in construction with the grid and associated devices of the first folding mechanism, it is unnecessary to describe the former in detail.

It is pointed out, however, that the sheet may be folded in book or news imposition by the fourth folding mechanism on opposite sides thereof, or said sheet may be passed through the folding mechanism from either side thereof without being folded thereby. When folding the sheet in either side of the fourth folding mechanism, the combined sheet stop and deflector will be positioned as indicated in full lines in Fig. 6 of the drawings. When the sheets are passed through the fourth folding mechanism from either side thereof without folding, however, the combined sheet stop and deflector 321" will be positioned as indicated in dotted lines in Fig. 6 of the drawings. The manner of folding sheets by the fourth folding mechanism, and the manner of deflecting sheets therethrough without folding will, it is thought, be clearly understood from the preceding description of the operation of the first and third folding mechanisms, and it is therefore unnecessary to describe, in detail, the aforesaid operation as respects the fourth folding mechanism. It is pointed out, however, that when the sheets are delivered from the fourth folding mechanism from either side thereof, said sheets are delivered onto the stacker board 338 and fed and stacked therealong by the tapes 329. The stacker will be positioned as shown in full lines in Fig. 6 of the drawings, and said stacker and its controlling and operating mechanism will now be described in detail.

STACKER AND CONTROLLING AND OPERATING MECHANISM THEREFOR

Figs. 1, 1a, 6, 9, 10, 16, 23, 26, 27 and 39

In accordance with the present invention, operation of the movable parts of the stacker is controlled by the sheets as they are delivered from the feeder onto the driven tapes 153 of the infeed conveyor. Accordingly, the sheets, in passing from the feeder to said conveyor, successively engage and operate a control member 627 which, through mechanism to be presently described, controls the operation of the tapes 329 of the stacker so that in the course of delivery of sheets either from the first folding mechanism or the fourth folding mechanism, said sheets and said tapes will be moved one step forward along the stacker board 338 each time a sheet engages and moves the control member 627.

The control member 627 is arranged to swing up and down between the upper reaches of the two innermost tapes 153, and said control member is secured, as at 628, on a rockshaft 629. The rockshaft 629 extends transversely of the conveyor between the tapes 153, and is journalled in suitable bearings on the forward ends of arms 630. These arms 630 are secured at 631 on one of the stay shafts 158 which extend transversely of the conveyor at the front and rear thereof and are secured thereon at 159. Fixed on the rockshaft 629, at the near side of the conveyor, is an arm 634 with which is connected one end of a spring 635. The opposite end of the spring 635 is connected with an arm 636 extending outwardly from the near side of the conveyor. This arm 636 is secured to the rearmost slotted cross bar 212 by one of the fastening devices therefor with the adjacent conveyor frame member 105.

The arm 634 has pivotally connected therewith one end of a link 637 the opposite end of which is pivotally connected with a forked lever 638 that has a short arm 639 and a long arm 640. The lever 638 is pivoted at 641 on a bracket 642 that is bolted or otherwise suitably secured, as at 643, on the conveyor frame member 105 at the near side of the machine.

The arms 639, 640 of the lever 638 engage over a pin 644 which is secured to the free end of an arm 645. This arm 645 is fixed on a rockshaft 646 and is journalled in suitable bearings in a plate 647 and the arm 107 of side frame member 5. The plate 647 is spaced from and secured to the side frame member 5 and the arm 107 thereof, by any suitable means for this purpose, and the lever 638 and the arm 645 are arranged back of said plate as indicated in dotted lines in Figs. 10 and 17 of the drawings. In the embodiment of the invention herein disclosed, the rod 110 and the link 99 are disconnected and removed, in order to swing the conveyor 105, 153 upwardly to an inoperative position. In this case, the conveyor and all parts carried thereby are swung up about the shaft 106, and the long arm 640 of the forked lever 638 travels along and is guided by the pin 644 of arm 645. When the conveyor 105, 153 and the parts carried thereby are swung down to the full line positions, thereof shown in the drawings, the arm 640 of forked lever 638, through its engagement with pin 644 of arm 645, automatically guides said forked lever into operative position on said pin. Fixed on the rockshaft 646 in front of the plate 647 is an arm 648 which extends between spaced pins 649. These pins 649 are secured to the plate 647 in any suitable manner and limit rocking motion of the shaft 646 and the parts carried thereby. The arm 648 has pivotally connected therewith, as at 650, a finger 651. This finger 651 is bent intermediate its opposite ends to provide a horizontally extending detent 652 that passes under a bracket 653 and over the upper end of a vertical spring pressed rod 654. The bracket 653 is bolted or otherwise suitably secured to the plate 647, and said plate is provided on the front thereof with a lug 655 having an opening therein through which the rod 654 loosely extends.

The detent 652 also passes over a roller 652' which is journalled on the plate 647 and serves to support said detent. The forward end of the detent 652 engages the upper end of a lever 656 which is pivotally mounted, as at 657, on the plate 647. The upper end of lever 656 is maintained in engagement with the detent 652 by a spring 658 the opposite ends of which are connected with said lever and the lug 655, respectively. The lever 656 is provided with a shoulder 659 adapted to engage one arm 660 of a bell crank 661 that is pivoted at 662 on the plate 647. The arm 660 of bell crank 661 passes over a roller 663 journalled on the plate 647, and the other arm 664 of said bell crank is bent to provide a detent 665 adapted to engage a shoulder 666 on the rod 654. The shoulder 666 is provided by an elongated notch 667 in the rod 654 and a second shoulder 668 is also formed in said rod by said notch. The bell crank arm 664 has connected therewith one end of a spring 669 the opposite end of which is connected with the plate 647. This spring 669 will rock the bell crank 661 about its pivot when the arm 660 is disengaged from the shoulder 659 of lever 656, as hereinafter pointed out.

The rod 654 is preferably made in two parts adjustably connected together as by a sleeve 670 and set screws 671 that enable the rod to be lengthened or shortened as desired. The rod 654 extends downwardly through the head 672 of an eye bolt 673 that is secured to the side frame member 5 below the plate 647. Mounted on the rod 654 between the head 672 and a collar 674 fixed on said rod below said head, is a spring 675 which, when the detent 665 is disengaged from the shoulder 666 of said rod, will push the latter downwardly. The lower end of the rod 654 is pivotally connected at 676 with the free end of a pawl 677 the tooth of which is indicated at 678. The pawl 677 is fixed on a short rockshaft 679 journalled in suitable bearings on the side frame member 5 and projecting outwardly therefrom. The rockshaft 679 also has fixed thereon an arm 680 the free end of which carries a roller 681. The pawl 677 and the arm 680 are arranged at opposite sides, respectively, of a ratchet 686. The teeth for the ratchet 682 are indicated at 683, and said ratchet is loosely mounted on the shaft 388 between the side frame member 5 and a pinion carrier 684. This pinion carrier 684 is secured to the shaft 388 by a set screw 685, and said carrier rotates continuously with said shaft.

The pinion carrier 684 forms part of a small planetary gear mechanism including a bevel gear 686 that is secured to or formed integrally with the ratchet 682. This bevel gear 686 meshes with a similar gear 687 which is journalled on a stud 688 extending at right angles to the shaft 388 and secured in any suitable manner on the pinion carrier 684. The bevel pinion 687 meshes with a similar pinion 689 loosely mounted on the shaft 388 and retained against endwise displacement therefrom, as by a cap screw 690. This bevel pinion 689 has secured to or formed integrally therewith a cam 691 provided eccentrically of the shaft 388 with a crank pin 692. Normally, the pawl 677 is disengaged from the ratchet 682, and said ratchet is rotated on the shaft 388 by the rotating carrier 684 and the bevel gears 686, 687. During rotation of the ratchet 682, the bevel gear 687 rotates about the bevel gear 689 and the latter and the cam 691 remain stationary through the resistance of connections for said cam with stacker operating mechanism, to be hereinafter described.

When the pawl 677 is engaged with the ratchet 682, however, rotation of the latter is prevented, and the bevel gears 687 and 689 rotate the cam 691 on the shaft 388. During rotation of the cam 691, as stated, the bevel gear 687 rotates about the bevel gear 686. Each time a sheet actuates the finger 627, the pawl 677, through the described connections therefor with said finger, is engaged with the ratchet 682 so that the cam 691 is rotated. During rotation of the cam 691, its high part engages the roller 681, thus lifting the arm 680 rocking the shaft 679 and disengaging the tooth 678 of the pawl 677 from the ratchet 682. Rotation of the cam 691 is thus prevented until the finger 627 is again actuated, and it will appear that said cam is intermittently operated as the sheets successively actuate the finger 627. The cam 691 is connected with, and operates the movable parts of the stacker, so that said parts are likewise intermittently operated. The cam 691 makes one complete revolution during each cycle of its operation, and the movable parts of the stacker and the sheets thereon are thus advanced one step forward during each cycle of operation of said cam.

Each sheet passing from the feeder to the conveyor, engages and depresses the finger 627, thus rocking the shaft 629 so that the link 637 is moved forwardly. The arm 638 is thereupon swung forwardly and through its connection with the rockshaft 646, rocks the latter so that the arm 648 is likewise swung forwardly. The finger 652 is thereupon moved forwardly so that the arm 656 is swung in the same direction and the arm 660 is disengaged from the shoulder 659. The spring 669 then disengages the detent 665 from the shoulder 666 on rod 654, whereupon said rod is moved downwardly by the spring 675 so that the pawl 677 is engaged with the ratchet 682 and the cam 691 is rotated through one revolution. The arm 680 is thus swung downwardly to bring the roller 681 in the path of travel of the high part of cam 691 and at the end of the revolution of said cam, the high part thereof engages said roller so that the shaft 679 is rocked to disengage the pawl 677 from the ratchet 682. The pawl 677 is thus lifted, and moves the rod 654 upwardly at about the time the sheet passes off the finger 627. When the rod 654 moves upwardly, the shoulder 668 thereon engages the detent 665 so that the bell crank 661 is rocked to swing the arm 650 upwardly above the shoulder 659 on arm 656.

When the rod 654 moves upwardly, the top thereof engages finger 652 and moves the same upwardly out of engagement with the arm 650. The spring 658 then engages the shoulder 659 of arm 656 under the arm 660 and the spring 635 moves arm 634 and shaft 629 to rest the finger 627 and the parts connected with said shaft. The finger 652 is thus reengaged with the arm 656 as shown in the drawings and the parts are held in their full line positions therein illustrated until the next sheet engages and depresses the finger 627. The described operations of the rod 654 and the control devices connected therewith are repeated as the sheets successively pass from the feeder over the finger 627, so that the cam 691 is rotated intermittently to actuate the stacker mechanism in like manner. For this purpose, the crank pin 692 on cam 691 has pivotally connected therewith one extremity of a link 693. The opposite extremity of the link 693 is provided with a hook 694. This hook 694 is adapted to be detachably engaged over a stud 695 slidably mounted in the slot 696 of a lever 697 and retained against displacement therefrom in any suitable manner. The lever 697 is rotatably mounted on a shaft 698 extending transversely of and below the stacker board 330 and journalled in suitable bearings on brackets 723 which are secured to said board at opposite sides thereof, respectively.

The stacker may, as previously pointed out, be positioned to receive sheets from the first folding mechanism, as shown in Fig. 1 of the drawings, or said stacker may be positioned to receive sheets from the fourth folding mechanism, as shown in Fig. 6 of the drawings. When the stacker is positioned to receive sheets from the first folding mechanism, the shaft 698 is received in open bearings 699 formed on the side frame members 5 and 6 near the top and at the front thereof. In this case, the stacker is supported by an extension rod 700 telescopically fitted within a standard 701 and retained in position to support the front end of the stacker, as by a set screw 702. When the stacker is positioned to receive sheets from the fourth folding mechanism, the shaft 698 is received in open bearings 703 formed on the side frame members 5 and 6 in line with said fourth folding mechanism. In this case, the extension 700 is removed, or telescoped within the standard 701, and the latter supports the front end of the stacker.

Pivotally mounted on the upper end of the lever 699 is a pawl 704 that is urged by a spring 705 in engagement with a ratchet 706. The opposite ends of the spring are connected with the pawl 704 and the lever 697, respectively, and the ratchet 706 is fixed on the shaft 698 adjacent said lever. The shaft 698 also has fixed thereon a sprocket 707 around which passes a chain 708 that also passes around a sprocket 709. This sprocket 709 is fixed on a shaft 710 at one end thereof, and said shaft is journalled in suitable bearings 710' provided by brackets 723. The shaft 710 also has fixed thereon pulleys 711, and the tapes 329 pass over and under the stacker board 330 and around said pulleys. The tapes 329 also pass around pulleys 712 and 713. The pulleys 712 are rotatably mounted on a shaft 714 that is mounted in any suitable manner on the stacker board 330 at the front thereof. The pulleys 713, in turn, are journalled on arms 715 fixed on the shaft 714 and retained thereon by any suitable means for this purpose. The pulleys 713 serve to take up the slack in the tapes 329, and it will appear, from the foregoing, that said tapes are driven from the shaft 710 through the described driving connections therefor with the shaft 698. The shaft 698, in turn, is rotated intermittently by the pawl and ratchet mechanisms 704, 706 and the described connection for the pawl carrying arm 697 with the cam 691.

The stacker, as previously pointed out, extends across the entire width of the machine, and when said stacker is positioned to receive sheets from the fourth folding mechanism, the sheets may be delivered therefrom onto said stacker either from the rollers 531, 587 or 531', 587'. When the stacker is positioned to receive sheets from the first folding mechanism, the sheets may be delivered from either side thereof to said stacker by the rollers 290, 323 in accordance with the position of the endless side guide 155. In order to change the position of the stacker from the first folding mechanism to the fourth folding mechanism, or vice versa, the hook 694 may be disengaged from the stud 695, whereupon the stacker may be moved bodily from one position to the other during which movement the shaft 698 is lifted out of the bearings 699 or 703, as the case may be. When the stacker is positioned, as desired, with the shaft 698 in the bearings 699 or 703, the hook 694 is engaged over the stud 695, as before described, so that the movable parts of the stacker may be operated by the cam 691 and the link 693. Normally, the cam 691 and the link 693 are retained in the full line positions thereof shown in the drawings, by a spring 716. Accordingly, the link 693 may be provided near the crank 692 with a hook 717 to which one end of the spring 716 is connected. The spring 716 extends forwardly and downwardly from the crank pin 692, and the opposite end of said spring is secured to the side frame member 5 by a short pin 716' as shown in Fig. 23.

As the sheets pass from the first folding mechanism or the fourth folding mechanism, to the stacker, they engage cam shaped deflecting devices 718 acting to deflect the sheets into engagement with the tapes 329. These deflecting devices are mounted on or formed integrally with arms 720 on which are journalled, as at 719, rollers 721 under which the sheets are moved by the tapes 329. The arms 720 are rotatably mounted and adjustably retained on a shaft 721' extending transversely of the stacker and carried by brackets 722 secured in any desired position of adjustment in guides 723' which are formed on brackets 723 carrying the stacker board 330 and the shaft 698. It will appear, that the stacker only operates when sheets are being fed into the machine, and that said stacker may be readily shifted into operative relation with either the first folding mechanism or the fourth folding mechanism and there actuated by a common operating mechanism therefor.

OPERATION

The operation of the machine will be readily understood from the foregoing, and may be briefly summarized as follows. The sheets 40 are successively separated and forwarded by the sheet separating and feeding wheel 80, and as sheets are separated and forwarded, the supply of sheets is intermittently advanced by the feed drum 42 and the associated tapes through the described means for this purpose. Each sheet separated and advanced by the wheel 80 is delivered onto the driven tapes 131 which, in turn, deliver the sheet onto the tapes 153 of the conveyor carried by the folding machine. The tapes 153, as before described, direct the sheets laterally against the moving endless side guide 155 which registers each sheet with the first folding mechanism. The tapes 153, after registration of the sheet by said side guide, deliver the sheet between the knurled rollers 220, 221 of the first folding mechanism. These rollers, together with the rollers 226, 229, 232 and 235 feed the sheets through the first folding mechanism where said sheet may receive one or more parallel folds as previously described. In the event the sheet is then to be passed directly out of the machine, the stacker is positioned in operative relation with the first folding mechanism, and the deflector 344 is thrown over to its inoperative position and the roller 323 is thrown into cooperative relation with the roller 290. These rollers then deliver the sheets, with one or more parallel folds therein, to the stacker which is operated intermittently and controlled through the described means for this purpose.

In the event the sheets are to be delivered from the fourth folding mechanism, the deflector 344 is thrown over into its operative position, and the roller 323 is thrown over into its inoperative position. The sheets then pass from the first folding mechanism to the first transfer mechanism, and said sheets may have one or more parallel folds made therein, or they may pass to the first transfer mechanism from the first folding mechanism without being folded thereby. In either case, the second transfer mechanism delivers the sheets onto the sheet stops 420 and the sheet supports 354, whereupon the knife 405 is operated, as before described, and folds the sheet between the rollers 463, 464 of the third folding mechanism. The fold made in the sheet by the knife and these rollers is at right angles to any fold or folds previously made therein, and the sheet may then receive a fold from the third folding mechanism which is parallel to the folds made by the knife, or said sheet may be passed through the third folding mechanism without folding thereby. In either case, the rollers 463, 466 receive the sheet to the right or to the left of the third folding mechanism, in accordance with the character of folding or delivery to be made thereby, whereupon said sheet is received by the second transfer mechanism 512 which, as previously pointed out, may be positioned at either side of the third folding mechanism.

The transfer mechanism 512, in turn, feeds the sheet between the rollers 530, 531, or 530', 531' in accordance with the character of fold to be made in the sheet by the fourth folding mechanism, and the rollers 531, 587 or 531', 587' then deliver the sheet onto the stacker which has been positioned adjacent the fourth folding mechanism to receive the sheets therefrom. The sheet may, as previously pointed out, be delivered through the fourth folding mechanism without being folded thereby, in which case the sheet would pass onto the stacker from the left or the right of the fourth folding mechanism in accordance with the position of the shiftable parts of the third folding mechanism and the position of the second transfer mechanism 512.

It will appear, from the foregoing, that the present invention may be embodied in a machine capable of making a wide variety of folds in sheets, thus meeting the demand for mechanism that will enable an establishment to handle in a satisfactory manner various jobs of folding that otherwise would require individual machines respectively for their accomplishment. It will further appear, that the present invention may be embodied in a machine having feeding, folding, and stacking mechanisms conveniently arranged in cooperative relation and automatically controlled by the sheets that pass thereto. Further, the present invention may be embodied in a machine having sheet registering, conveying, folding, and transferring mechanisms selectively movable to various positions to facilitate the folding of various jobs, or to throw out of operation instrumentalities not required for the folding of certain jobs, or to enable access to be readily had to parts of the various mechanisms, as the case may be. Further, it will appear, that the present invention may be embodied in a machine that includes in the folding instrumentalities thereof, a knife controlled and operated by novel devices through the sheets themselves, or through an adjacent folding mechanism that is movable into and out of operative position and controls the knife so that it may not operate, with possible injury to the machine attendant, when said folding mechanism is out of position.

It will further appear, that the present invention may be embodied in a machine having a stacker operated by a single mechanism and shiftable into operative relation with two different folding instrumentalities in accordance with the particular job of folding to be handled in the machine. These and other described features of the present invention contribute to the production of a machine that is efficient in its construction and operation, and in which various movable and shiftable parts thereof are continuously maintained in driving relation with a common source of power, regardless of the position of said parts.

The present invention may be embodied in a machine including all of the various mechanisms herein described, but it is to be expressly understood, that certain of said mechanisms may be employed independently for various purposes, or that any one or more of the mechanisms may be associated and employed for various purposes independently of the other mechanism or mechanisms. It is to be further expressly understood, that while one embodiment of the present invention has herein been described and illustrated with more or less particularity, the invention is not limited to said embodiment, or otherwise than by the terms of the appended claims.

What is claimed is:

1. In a folding machine, means for making one or more parallel folds in a sheet, means for making a right angle fold therein, means for making a second right angle fold in the sheet parallel with the preceding right angle fold and in one or the other of two impositions, and means for making a following fold in the sheet at right angles to the preceding fold and in one or the other of two impositions according to the imposition of the preceding fold.

2. In a folding machine, one or more parallel loop folders, a right angle knife folder adapted to receive and fold sheets delivered therefrom, a right angle loop folder normally parallel with the knife folder and adapted to receive sheets therefrom and selectively fold them in different impositions, and a loop folder adapted to receive sheets from said right angle loop folder.

3. In a folding machine, one or more parallel loop folders, a right angle knife folder, means for transferring sheets from said loop folder or folders to the right angle knife folder, a right angle loop folder normally parallel with the knife folder and adapted to receive sheets therefrom and selectively fold them in different impositions, and a loop folder extending transversely of the preceding loop folder and adapted to selectively receive sheets from opposite sides thereof and fold them in different impositions respectively.

4. In a folding machine, one or more parallel loop folders, a right angle knife folder adapted to receive sheets therefrom, a book and news imposition loop folder normally parallel with said knife folder and adapted to receive sheets therefrom, a book and news imposition loop folder adapted to selectively receive sheets from opposite sides thereof, and a transfer mechanism selectively movable to one side or the other of the first named book and news imposition loop folder and adapted to transfer sheets therefrom to said second named book and news imposition loop folder.

5. In a folding machine, one or more folders, a right angle folder adapted to receive sheets therefrom, a book and news imposition folder adapted to receive sheets from the right angle folder, and a book and news imposition folder adapted to receive sheets from said first named book or news imposition folder.

6. In a folding machine, a knife folder, a book and news imposition loop folder normally parallel with said knife folder and adapted to receive sheets therefrom, and a book and news imposition loop folder extending transversely of said loop folder and adapted to receive sheets delivered from one side or the other thereof.

7. In a folding machine, a knife folder, and a book and news imposition loop folder normally parallel with the knife folder to receive sheets therefrom and movable toward and away from said knife folder to operative and inoperative positions respectively.

8. In a folding machine, folding means, and book and news imposition folding means bodily movable as a unit toward and away from said first named folding means into and out of operative relation therewith.

9. In a folding machine, book and news imposition folding means, a second folding means extending transversely thereof, and sheet transferring means selectively movable to one side or the other of the book and news imposition folding means to deliver sheets therefrom to said second folding means.

10. In a folding machine, a loop folder adapted to selectively fold sheets in different impositions and deliver them in opposite directions respectively, and a transfer mechanism selectively movable to one side or the other of said loop folder to receive sheets delivered therefrom in either of said directions.

11. In a folding machine, a folder adapted to selectively fold sheets in two different impositions and deliver them in opposite directions respectively, a transfer mechanism selectively movable to one side or the other of said folder to receive sheets delivered in either of said directions, and a folder adapted to receive sheets from said transfer mechanism when the latter is positioned at either side of said first named folder.

12. In a folding machine, one or more folders, a folder adapted to receive sheets therefrom, a folder adapted to receive sheets from the preceding folder, and a stacker selectively movable into operative relation with said first and last named folders.

13. In a folding machine, one or more folders, a folder adapted to receive sheets therefrom, one or more folders adapted to receive sheets from the preceding folder, a stacker selectively movable into operative relation with said first and last named folders, and a single means for operating said stacker in each of its operative positions.

14. In a folding machine, one or more loop folders, a knife folder adapted to receive sheets therefrom, a book and news imposition folder adapted to receive sheets from the knife folder, a second book and news imposition folder, means for selectively delivering sheets out of the machine directly from the loop folder or folders or from the latter to the knife folder, and a stacker selectively movable into operative relation with the loop folder or folders and said last named book and news imposition folder.

15. In a folding machine, one or more loop folders, a knife folder adapted to receive sheets therefrom, and sheet slitting and guiding means selectively movable to different positions to receive sheets from said loop folder or folders or enable said sheets to be delivered therefrom to said knife folder.

16. In a folding machine, loop folding mechanism, a removable stacker adapted to receive sheets therefrom, and separately mounted sheet slitting means movable into and out of operative relation with said loop folding mechanism and adapted to divide the sheets into a plurality of sections before delivery of the same to said stacker.

17. In a folding machine, sheet folding means, sheet slitting means movable into and out of operative relation therewith, and a sheet feeding roller selectively movable into operative relation with said sheet slitting means and said sheet folding means.

18. In a folding machine, sheet folding means, sheet slitting means arranged to swing toward and away from the sheet folding means, and a feed roller shiftable in one direction into cooperative relation with the sheet slitting means and shiftable in the opposite direction into operative relation with said sheet folding means.

19. In a folding machine, sheet folding means, sheet slitting means movable into and out of operative relation therewith, and a deflector movable into and out of operative relation with the sheet folding means to enable sheets to be delivered therefrom to a following folding means or to said sheet slitting means.

20. In a folding machine, sheet folding means, sheet slitting means movable into and out of operative relation therewith, a feed roller shiftable in one direction into operative relation with the sheet slitting means and shiftable in the opposite direction into operative relation with the sheet folding means, means for driving the roller in one direction when it is shifted into operative relation with the sheet slitting means, and means for driving said roller in the opposite direction when it is shifted into operative relation with said sheet folding means.

21. In a folding machine, sheet folding means, sheet slitting means movable into and out of operative relation therewith, and independent yieldable retaining means adapted to be engaged with and disengaged from the sheet slitting means when it is moved into and out of operative relation with the sheet folding means, respectively.

22. In a folding machine, one or more horizontally arranged loop folders, a vertical knife folder adapted to receive sheets therefrom, and pivotally mounted sheet supporting means arranged adjacent the knife folder and adjustable to register the sheets properly therewith.

23. In a folding machine, sheet folding means, a vertical knife folder, pivotally mounted sheet supporting means adjacent the knife folder, means for transferring sheets from the sheet folding means onto the sheet supporting means for folding by the knife folder, and means for adjusting said sheet supporting means to properly register the sheets with said knife folder.

24. In a folding machine, a knife folder, mechanism for operating the same, sheet supports at opposite sides of the knife folder respectively, and sheet actuated stops arranged between said supports and controlling the operation of said mechanism and said knife folder.

25. In a folding machine, one or more horizontally arranged loop folders, a vertical knife folder adapted to receive sheets therefrom, knife folder operating mechanism, and sheet actuated stops arranged in the path of travel of the sheets from the loop folder or folders to the knife folder and controlling the operation of said mechanism and said knife folder.

26. In a folding machine, two folding mechanisms one movable into and out of operative relation with the other, and means controlled by the movable folding mechanism for controlling the operation of the other folding mechanism.

27. In a folding machine, a knife folder, a loop folder movable into and out of operative relation with said knife folder, and means controlled by the loop folder through movement thereof toward and away from the knife folder and controlling the operation of the latter.

28. In a folding machine, sheet folding means, and a loop folder movable into and out of operative relation with said sheet folding means and including a grid and a roller shiftable to different positions whereby said loop folder may fold sheets in book or news imposition.

29. In a folding machine, sheet folding means, a support arranged to swing toward and away from the same, and a loop folder carried by and movable as a unit with said support and including a grid and a roller shiftable to different positions on the support whereby said loop folder may fold sheets in book or news imposition.

30. In a folding machine, a knife folder, and a loop folder adapted to receive sheets from the knife folder and movable bodily toward and away from said knife folder into and out of operative relation therewith.

31. In a folding machine, a knife folder, and a book and news imposition loop folder arranged to swing in the plane of movement of the knife folder toward and away from said knife folder into and out of operative relation therewith.

32. In a folding machine, two loop folders extending transversely of each other and both adapted to fold sheets in one or the other of two impositions, and means for transferring sheets from one of said loop folders to the other.

33. In a folding machine, a loop folder arranged horizontally across the entire width thereof, and sheet folding means adapted to deliver sheets selectively from its opposite sides to said loop folder.

34. In a folding machine, a loop folder selectively adapted to fold sheets in one or the other of two impositions and deliver them in opposite directions respectively, a loop folder arranged transversely thereto and extending across the entire width of the machine, and means selectively movable to one side or the other of said first named loop folder to receive sheets delivered in either of said directions and deliver them to one side or the other of said second named loop folder.

35. In a folding machine, a right angle loop folder, supporting means therefor, a second loop folder extending across the entire width of the machine at right angles to the first loop folder and supported centrally by its supporting means, and means for transferring sheets to the second loop folder from the first loop folder.

36. In a folding machine, a loop folder, and a combined sheet stop and deflector mounted on and adjustable along the grid of said folder to various positions.

37. In a loop folding machine, a grid, and a combined sheet stop and deflector mounted on said grid and adjustable therealong to various positions.

38. In a loop folding machine, a grid, sheet feeding and folding rollers associated therewith, and a single means movable on the grid into the rollers to deflect sheets therethrough without folding and movable on the grid to form a sheet stop for sheets passing therein and folded by said rollers.

39. In a loop folding machine, a grid, a combined sheet stop and deflector movable on said grid to various positions, and means for securing said combined sheet stop and deflector in each of said positions.

40. In a loop folding machine, a grid, a combined sheet stop and deflector carried thereby, and means providing for movement of said combined sheet stop and deflector along said grid to various positions thereon.

41. In a loop folding machine, a grid, sheet feeding and folding rollers associated therewith, a combined sheet stop and deflector mounted on the grid, and means providing for adjustment of the combined sheet stop and deflector longitudinally and transversely of the grid whereby said combined sheet stop and deflector may move to various sheet stopping positions on the grid and to a sheet deflecting position within said rollers.

42. In a folding machine, a series of parallel grids, a series of sheet feeding and folding rollers associated therewith, and pivotally mounted bearings for said rollers.

43. In a folding machine, a plurality of parallel grids, a plurality of sheet feeding and folding rollers associated therewith, bearings for said rollers, and means pivotally mounting said bearings and the rollers carried thereby.

44. In a folding machine, a plurality of parallel grids, a plurality of sheet feeding and folding rollers associated therewith, and pivotally and yieldably mounted bearings for said rollers.

45. In a folding machine, a plurality of parallel grids, a plurality of parallel sheet feeding and folding rollers associated therewith, nested and interfitted bearings for said rollers, and means pivotally mounting the bearings and the rollers carried thereby.

46. In a folding machine, a plurality of parallel grids, a plurality of parallel sheet feeding and folding rollers associated therewith, nested and interfitted bearings for the rollers, and means for adjusting one roller through the bearings of a roller adjacent thereto.

47. In a folding machine, a plurality of parallel grids, a plurality of parallel sheet feeding and folding rollers associated therewith, pivotally mounted bearings for the rollers, and means for adjusting the rollers independently of each other.

48. In a folding machine, a plurality of parallel grids, a plurality of sheet feeding and folding rollers associated therewith, pivoted bearings for certain of the rollers, and roller adjusting means carried by certain of said bearings.

49. In a loop folding mechanism including sheet feeding and folding rollers, pivotally mounted bearings for said rollers, and means for adjusting the rollers through said bearings.

50. In a loop folder, a driven roller, pivotally mounted bearings therefor, and means for adjusting the bearings and said roller.

51. In a loop folder, a driven roller, pivotally mounted bearings therefor, and yieldable roller supporting means engaged with said bearings.

52. In a loop folder, a driven roller, pivotally mounted bearings therefor, yieldable roller supporting means engaging the bearings, and roller adjusting means engaging the bearings in opposed relation with said yieldable supporting means.

53. In a loop folder, a driven roller, pivoted bearings therefor, yieldable roller supporting means engaging said bearings, a second driven roller and bearings therefor, and means for adjusting the first roller and mounted on the bearings of the second roller.

54. In a loop folder, two driven rollers, pivotally mounted bearings for one of the same, pivoted means carrying the other roller and yieldably engaged with said bearings, and adjusting means on said pivoted means and adapted to engage stationary parts of the machine.

55. In a folding machine, a pair of driven rollers, pivoted bearings for one of the same, pivotally mounted means carrying the other roller whereby it may swing into and out of operative relation with its companion roller, yieldable means on one side of the pivoted means and engaged with said bearings, and adjusting means on the opposite side of said pivoted means and engaged with a stationary part of the machine.

56. In a loop folder, a driven roller, pivoted bearings therefor, yieldable roller supporting means engaged with said bearings, and caps or covers for said yieldable roller supporting means.

57. In a loop folder, a driven roller, pivoted bearings therefor, studs, yieldable roller supporting means extending through said studs into engagement with said bearings, and caps or covers for said yieldable roller supporting means and fitted on said studs.

58. In a folding machine, a folding knife, crank means for reciprocating the same, a source of power, planetary gear mechanism for operating the crank means from said source of power, and sheet controlled means controlling the operation of said planetary gear mechanism.

59. In a folding machine, a folding knife, crank means for reciprocating the same, a source of power, planetary gear means for connecting the source of power with the crank means to operate the latter, sheet controlled means controlling the operation of said planetary gear means, and means for stopping the knife after each complete revolution of said crank means.

60. In a folding machine, a folding knife, crank means for reciprocating the same, a source of power, sheet controlled means operated upon delivery of a sheet to connect the source of power with the crank means and operate the latter and the knife, and means actuating a part of the sheet controlled means to stop the crank after each complete revolution thereof and hold the knife stationary until the sheet controlled means is again operated.

61. In a folding machine, a folding knife, crank means for reciprocating the same, planetary gear means for operating the crank means and including a ratchet, and sheet controlled means controlling the operation of said planetary gear means and including a pawl movable into and out of engagement with said ratchet.

62. In a folding machine, a folding knife, planetary gear means for operating the same, and sheet controlled means for controlling the operation of said planetary gear means.

63. In a folding machine, a folding knife, crank means for reciprocating the same and including a cam, planetary gear means for operating the crank means and including a ratchet, a pawl, sheet controlled means for engaging the pawl with the ratchet, and means operated by said cam for disengaging said pawl from said ratchet.

64. In a folding machine, a folding knife, means for reciprocating the same, trip mechanism controlling the operation of said means, and sheet folding means movable into and out of operative relation with the knife and engageable with and disengageable from a part of said trip mechanism to control the operation of the latter, the knife operating means, and said knife.

65. In a folding machine, a stacker, sheet folding means from which sheets are delivered thereto, means for feeding sheets to the sheet folding means, stacker operating mechanism, and means actuated by sheets fed to the sheet folding means and controlling the operation of said stacker operating mechanism and said stacker.

66. In a folding machine, sheet folding means, a stacker to which sheets are delivered therefrom, means for feeding sheets to the sheet folding means, and sheet controlled means for operating the stacker and including an element actuated by the sheets in their path of travel to the sheet folding means.

67. In a folding machine, sheet folding means, a stacker to which sheets are delivered therefrom, and sheet controlled means for operating said stacker and including a planetary gear mechanism.

68. In a folding machine, sheet folding means, a stacker to which sheets are delivered therefrom, a planetary gear mechanism connected with the stacker to operate the same, means for feeding sheets to the sheet folding means, and means controlling the operation of said planetary gear mechanism and including an element actuated by sheets in their path of travel to said sheet folding means.

69. In a folding machine, sheet folding means, and a transfer mechanism selectively movable to one side or the other of said folding means and driven at either side thereof by a following folding means.

70. In a folding machine, sheet folding means, supporting means at opposite sides thereof, and a transfer mechanism selectively movable to either side of said sheet folding means and adjustable along said supporting means.

71. In a folding machine, sheet folding means, a folding device, and sheet transferring means adapted to be driven by said sheet folding means and to deliver sheets thereto from said folding device.

72. In a portable transfer mechanism, a frame, inclined pairs of sheet feeding rollers mounted on said frame one pair above another, and driving means for said rollers mounted on said frame and driven by a folder when the transfer mechanism is positioned in operative relation therewith.

73. In a portable transfer mechanism, a frame, inclined pairs of sheet feeding rollers mounted on said frame one pair above another, means yieldably connecting each pair of rollers together, roller driving means mounted on the frame and providing for relative yielding movement of each pair of rollers, and means for driving said roller driving means.

74. In a portable transfer mechanism, a frame, a plurality of pairs of inclined sheet feeding rollers mounted on the frame one pair above another and the rollers of each pair being yieldable relatively, means for regulating relative yielding movement of each pair of rollers, and means on the frame for driving said rollers and providing for relative yielding movement of each pair thereof.

75. In a portable transfer mechanism, a frame, drive wheels mounted on the frame at the bottom thereof, a plurality of pairs of inclined sheet feeding rollers mounted on said frame one pair above another, and means for driving said rollers from said drive wheels.

76. In a portable transfer mechanism, a frame, a plurality of pairs of inclined sheet feeding rollers mounted on the frame one pair above another, drive wheels mounted on the frame at the bottom thereof and operatively connected with said inclined sheet feeding rollers to drive the same, and a substantially vertical sheet guide mounted on the frame and against which sheets may be fed laterally and downwardly by said inclined sheet feeding rollers.

77. In a portable transfer mechanism, a frame, roller driving means thereon, a plurality of pairs of inclined sheet feeding rollers mounted on the frame one pair above another and adapted to be driven by said roller driving means, and a substantially vertical sheet guide mounted on the frame and against which sheets may be fed laterally and downwardly by said inclined sheet feeding rollers.

78. In a portable transfer mechanism, a frame, a substantially vertical sheet guide thereon, and a plurality of pairs of inclined sheet feeding rollers mounted on the frame one pair above another and adapted to feed sheets laterally and downwardly on said guide.

79. In a portable transfer mechanism, a frame, a substantially vertical guide thereon, a plurality of pairs of inclined sheet feeding rollers mounted on the frame one pair above another and adapted to feed sheets laterally and downwardly against the sheet guide, and means for adjusting said sheet guide with respect to said rollers.

80. In a portable transfer mechanism, a frame, a substantially vertical grooved sheet guide pivotally mounted on the frame, a plurality of pairs of inclined sheet feeding rollers mounted on the frame one pair above another and adapted to feed sheets laterally and downwardly against the guide, and means for adjusting and retaining said sheet guide in position with respect to said rollers.

81. In a portable transfer mechanism, a frame, a pair of carriages mounted on the frame at the bottom thereof, drive wheels mounted on the carriages, vertical drive shafts journalled on and supported by the frame, driving connections between the drive wheels and said shafts, a plurality of pairs of inclined sheet feeding rollers mounted on the frame one pair above another and operatively connected with the drive shafts, and a substantially vertical sheet guide mounted on the frame and against which sheets may be fed laterally and downwardly by said inclined sheet feeding rollers.

82. In a portable transfer mechanism, a frame, a pair of carriages slidably mounted on the frame at the bottom thereof, drive wheels mounted on the carriages, vertical drive shafts slidably and rotatably mounted on the frame and operatively connected with said drive wheels, bevel roller driving devices adjustably mounted on the drive shafts one above another, and a plurality of pairs of inclined sheet feeding rollers mounted on the frame one pair above another and having bevels engaging said bevel roller driving devices.

83. In a folding machine, sheet folding means, tracks or bars extending substantially at right angles thereto, and a portable transfer mechanism slidably mounted on said tracks or bars and adapted to feed sheets laterally and downwardly from said sheet folding means.

84. In a folding machine, sheet folding means, tracks or bars extending substantially at right angles thereto, a portable transfer mechanism slidably mounted on said tracks or bars and adapted to feed sheets laterally and downwardly from said sheet feeding means, and means for detachably securing the portable transfer mechanism on the tracks or bars in any desired position of adjustment thereon.

85. In a folding machine, a frame, sheet folding means mounted thereon, and sheet conveying means adapted to feed sheets to the sheet folding means and pivotally mounted on said frame for swinging movement up and down to inoperative and operative positions, respectively.

86. In a folding machine, a frame, sheet folding means thereon, a tape conveyor adapted to feed sheets to said sheet folding means and pivotally mounted on said frame for swinging movement up and down to inoperative and operative positions respectively, and driving means for the tapes of said conveyor continuously connected therewith regardless of the position of said conveyor.

87. In a folding machine, a frame, sheet folding means thereon, a conveyor adapted to feed sheets to the sheet folding means and pivotally mounted on said frame to swing up and down to inoperative and operative positions respectively, and a driven endless side guide mounted on said frame and adapted to swing therewith to its inoperative and operative positions.

88. In a folding machine, a frame, sheet folding means thereon, sheet feeding means adapted to feed sheets to the sheet folding means and pivotally mounted on said frame to swing up and down to inoperative and operative positions, and sheet guiding means mounted on the sheet conveying means to swing therewith.

89. In a folding machine, a frame, sheet folding means thereon, a conveyor for feeding sheets to the sheet folding means and pivotally mounted on said frame for swinging movement to operative and inoperative positions respectively, movable sheet guiding means carried by the conveyor and movable therewith to said positions, and driving means for the conveyor and sheet guiding means continuously connected therewith regardless of the positions thereof.

90. In a paper folding machine of the kind described the combination with the feed rollers buckling rollers and buckling frames forming guide pockets of means adjustably mounted in said buckling frames and normally limiting the travel of a paper sheet from said feed rollers within said guide pockets and also acting as a deflector to prevent the entrance of a paper sheet from said feed rollers to said guide pockets, substantially as described.

91. A paper folding machine as claimed in claim 90 wherein said adjustably mounted means constitute a stop provided with teeth that engage in slots formed in the buckling frame.

92. In a folding mechanism, the combination of driven rollers, including spaced rollers and an intermediate roller co-operating with both of said spaced rollers, a buckle chute provided with slots which cut through the lower edge thereof, stops adjustably mounted in said slots with capacity for adjustment into close proximity to the intermediate roller thereby rendering the buckle chute inoperative, and means for adjusting said stops, the sides of said stops proximate said roller forming guides arranged for delivering sheets without folding them from a pair of receiving rollers directly to a pair of discharge rollers, said pairs of rollers, respectively, including different spaced rollers and the intermediate roller, which is common to both.

93. Folding mechanism as specified in claim 92, in which the guide faces of the buckle chute stops are curved.

94. Folding mechanism as specified in claim 92, in which the guide faces of the buckle chute stops are substantially concentric with the surface of the intermediate roller when said stops are in their positions of extreme contemplated advancement.

95. Folding mechanism as specified in claim 92, in which the spaced rollers are mounted with capacity for adjustment towards and from the intermediate roller and which comprises means for separately effecting such adjustments and for yieldingly locking said adjustable rollers in position.

EARL D. RADER.
EDWIN W. GOODWIN.